United States Patent
Inha et al.

(10) Patent No.: US 8,412,268 B2
(45) Date of Patent: Apr. 2, 2013

(54) DETECTION, IDENTIFICATION AND OPERATION OF PHERIPHERALS CONNECTED VIA AN AUDIO/VIDEO-PLUG TO AN ELECTRONIC DEVICE

(75) Inventors: Kai Inha, Järvenpää (FI); Pertti Saarinen, Salo (FI); Juha Backman, Espoo (FI)

(73) Assignee: Nokia Corporation, Espoo (FI)

( * ) Notice: Subject to any disclaimer, the term of this patent is extended or adjusted under 35 U.S.C. 154(b) by 936 days.

(21) Appl. No.: 11/666,186

(22) PCT Filed: Oct. 24, 2005

(86) PCT No.: PCT/EP2005/011557
§ 371 (c)(1),
(2), (4) Date: May 20, 2008

(87) PCT Pub. No.: WO2006/045617
PCT Pub. Date: May 4, 2006

(65) Prior Publication Data
US 2008/0318629 A1  Dec. 25, 2008

(51) Int. Cl.
*H04B 1/38* (2006.01)
(52) U.S. Cl. .......... 455/557; 348/14.01; 348/207.1
(58) Field of Classification Search .......... 455/557
See application file for complete search history.

(56) References Cited

U.S. PATENT DOCUMENTS

| | | | | |
|---|---|---|---|---|
| 4,430,699 A | * | 2/1984 | Segarra et al. | 709/230 |
| 4,469,952 A | * | 9/1984 | Olson et al. | 250/551 |
| 4,645,295 A | * | 2/1987 | Pronovost | 385/55 |
| 4,915,639 A | * | 4/1990 | Cohn et al. | 439/188 |
| 5,550,755 A | * | 8/1996 | Martin et al. | 340/815.47 |
| 5,708,551 A | * | 1/1998 | Bosatelli | 361/62 |
| 5,887,194 A | * | 3/1999 | Carson et al. | 710/36 |
| 5,959,536 A | * | 9/1999 | Chambers et al. | 710/104 |
| 6,069,960 A | * | 5/2000 | Mizukami et al. | 381/74 |
| 6,185,627 B1 | * | 2/2001 | Baker et al. | 710/1 |
| 6,397,087 B1 | * | 5/2002 | Kim et al. | 455/569.1 |
| 6,475,001 B2 | * | 11/2002 | Ohbayashi et al. | 439/83 |
| 6,518,993 B2 | * | 2/2003 | Kerai et al. | 348/14.01 |
| 6,586,337 B2 | * | 7/2003 | Parikh | 438/692 |
| 6,614,750 B2 | * | 9/2003 | Weber et al. | 720/718 |
| 6,792,246 B2 | * | 9/2004 | Takeda et al. | 455/41.1 |
| 6,811,325 B2 | * | 11/2004 | O'Connor | 385/92 |
| 6,834,138 B2 | * | 12/2004 | Krol et al. | 385/18 |
| 6,971,907 B1 | * | 12/2005 | Stroud | 439/490 |
| 7,027,836 B2 | * | 4/2006 | Zacks et al. | 455/557 |
| 7,069,059 B2 | * | 6/2006 | Osawa | 455/572 |
| 7,091,866 B2 | * | 8/2006 | Nishibori | 340/574 |
| 7,094,087 B2 | * | 8/2006 | Larn | 439/188 |
| 7,139,590 B2 | * | 11/2006 | Liu et al. | 455/557 |

(Continued)

FOREIGN PATENT DOCUMENTS

| | | |
|---|---|---|
| EP | 1 133 185 A2 | 9/2001 |
| EP | 1 447 944 A2 | 8/2004 |
| WO | WO-2004/047711 A1 | 7/2004 |

*Primary Examiner* — Hai Nguyen
(74) *Attorney, Agent, or Firm* — Harrington & Smith

(57) ABSTRACT

An electronic device including a jack arranged to receive a peripheral device A/V plug, the A/V plug providing an end-terminal for a peripheral device to be connected to the jack, wherein the device is arranged to detect insertion of the A/V plug, and upon detection of insertion, discriminate the functionality provided by the peripheral device.

29 Claims, 25 Drawing Sheets

U.S. PATENT DOCUMENTS

| | | | |
|---|---|---|---|
| 7,151,911 B2* | 12/2006 | Matsumoto | 455/90.2 |
| 7,224,851 B2* | 5/2007 | Kinjo | 382/276 |
| 7,224,962 B1* | 5/2007 | Kite | 455/412.1 |
| 7,241,158 B2 | 7/2007 | Takagi | 439/188 |
| 7,269,355 B2* | 9/2007 | Naoe et al. | 398/118 |
| 7,283,044 B2* | 10/2007 | Bandy | 340/505 |
| 7,411,559 B2* | 8/2008 | Leinonen et al. | 343/718 |
| 7,503,785 B2* | 3/2009 | Stepniak | 439/187 |
| 7,510,423 B1* | 3/2009 | Stroud | 439/490 |
| 7,523,148 B2* | 4/2009 | Suzuki et al. | 1/1 |
| 7,605,863 B2* | 10/2009 | Oda et al. | 348/373 |
| 7,672,470 B2* | 3/2010 | Lee | 381/333 |
| 7,683,974 B2* | 3/2010 | Sun et al. | 348/705 |
| 7,736,193 B2* | 6/2010 | Edeler et al. | 439/675 |
| 7,808,250 B2* | 10/2010 | Honda et al. | 324/557 |
| 7,867,018 B2* | 1/2011 | Krieg et al. | 439/489 |
| 7,871,299 B2* | 1/2011 | Kawasaki et al. | 439/669 |
| 7,899,915 B2* | 3/2011 | Reisman | 709/228 |
| 8,203,325 B2* | 6/2012 | Miller et al. | 324/66 |
| 2002/0052150 A1* | 5/2002 | Ohbayashi et al. | 439/668 |
| 2002/0065076 A1* | 5/2002 | Monroe | 455/426 |
| 2003/0142984 A1* | 7/2003 | Masuda et al. | 398/115 |
| 2003/0144040 A1 | 7/2003 | Liu et al. | 455/568 |
| 2004/0041911 A1* | 3/2004 | Odagiri et al. | 348/207.1 |
| 2004/0142724 A1* | 7/2004 | Buttet | 455/556.1 |
| 2004/0162027 A1* | 8/2004 | Chang | 455/41.2 |
| 2004/0185902 A1* | 9/2004 | Yang | 455/557 |
| 2004/0204083 A1* | 10/2004 | Watanabe et al. | 455/557 |
| 2004/0204154 A1* | 10/2004 | Chang | 455/569.1 |
| 2004/0240885 A1* | 12/2004 | Naoe et al. | 398/118 |
| 2004/0264703 A1* | 12/2004 | Fujita | 381/1 |
| 2005/0015805 A1* | 1/2005 | Iwamura | 725/79 |
| 2005/0047082 A1* | 3/2005 | Osawa | 361/686 |
| 2005/0277322 A1* | 12/2005 | Postrel | 439/297 |
| 2005/0285799 A1* | 12/2005 | Leinonen et al. | 343/702 |
| 2006/0041655 A1* | 2/2006 | Holloway et al. | 709/223 |
| 2007/0197291 A1* | 8/2007 | Shimizu et al. | 463/36 |
| 2008/0188122 A1* | 8/2008 | Edeler et al. | 439/540.1 |
| 2009/0041257 A1* | 2/2009 | Yoshizawa et al. | 381/59 |
| 2009/0093899 A1* | 4/2009 | Ben-Yaacov et al. | 700/94 |
| 2009/0094663 A1* | 4/2009 | Ben-Yaacov et al. | 725/141 |
| 2009/0130910 A1* | 5/2009 | Inha et al. | 439/638 |
| 2010/0067158 A1* | 3/2010 | Saarinen | 361/91.1 |
| 2010/0124338 A1* | 5/2010 | Lee | 381/74 |

* cited by examiner

| Resistor | Pull-up voltage | Pull-up GND | Pull-up Hi-Z | Notes |
|---|---|---|---|---|
| 2.2 k ± 10 % | 2.05 V...2.25 V | Yes | Yes | Mic bias |
| 4.7 k ± 30 % | 2.4 V...2.6 V | No | Yes | Data mode |
| 10 k ± 10 % | 2.4 V...2.6 V | No | No | Data mode & microphone load detection |
*Fig. 1*
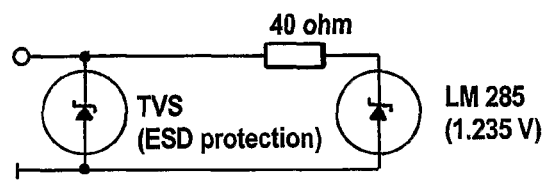
*Fig. 2*
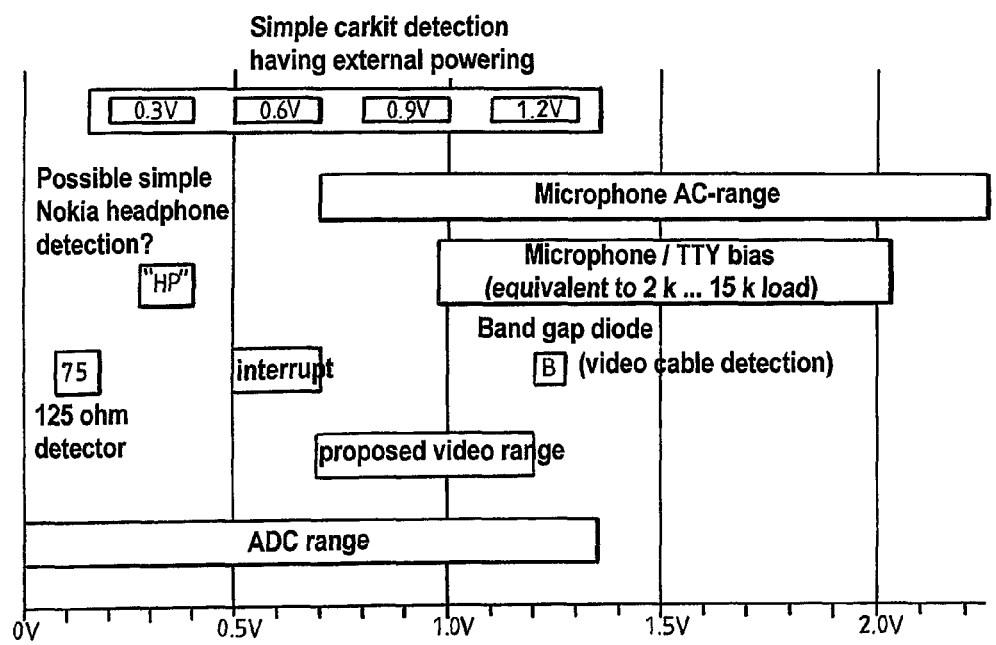
*Fig. 3*

| Interrupt | Host | ECI/ACI (slave) | Notes |
|---|---|---|---|
| ECI/ACI generates interrupt | Host reads/writes ECI registers | Mutes mic and waits, switches mic on after x ms data silence | Pop-sound from interrupt (sidetone). "Soft interrupt" /slopes/ proposed to minimize the pop. |
| Host generates interrupt | Host sends interrupt. Waits a moment and writes/reads ECI registers | Mutes mic and waits, switches mic on after x ms data silence | |

*Fig. 10*

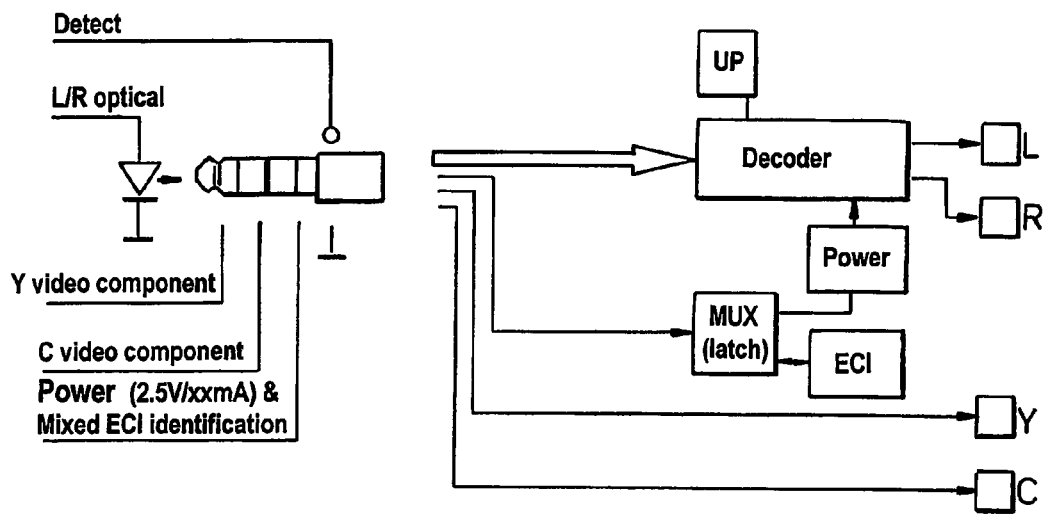

*Fig. 11*

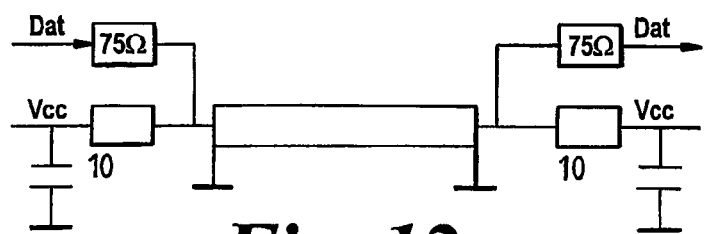

*Fig. 12*

One connector – multiple usecases

Ideas on how to use one, single 2.5 and 3.5 mm round 3 to 4 conductor plug for:

1. Analog headset with a simple, low cost switch for call answer and end, voice tag
2. Advanced headset with digital ID, multiple keys and audio parameter downloading for DSP tuning
   * Digital signaling multiplexed with microphone channel audio - a limiting factor but will fulfill most of the needed usecases. Audio mute while digital transmission. Will be using Nokia ACI circuit and protocol
   * Pin and functional compatibility with std headphones (3.5 mm version)
3. Includes Composite video and analog stereo output capabilities
4. Includes 16, 20 and bit digital stereo and multichannel audio (5.1 – 6.1) implementation option.
5. Includes a method to establish advanced remote controllers and headset/headphone interfacings over fully digital SPDIF connectivity for superior, no compromises audio quality and simultaneous full duplex data.
6. Expansion for combined SPDIF digital audio and S-video TV out
7. Expansion to SPDIF digital audio input for digital CD recording from home systems
8. Expansion mechanism to support optical digital multichannel audio
9. Capability to identify cables if ACI is implemented into the cable
10. All this over one std 3.5 mm or 2.5 mm plug using std cables for most of the usecases..

SPDIF stands for Sony Philips Digital Interface

*Fig. 16*

Basic stereo headphone pinout 3.5 mm std
Pinout the same with 2.5 mm and 3.5 mm to RCA connectors with std home domain connectivity.
Usecases: Stereo analog recording and playback
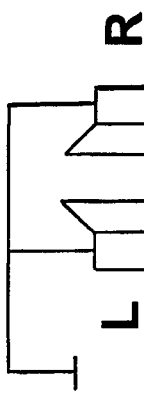
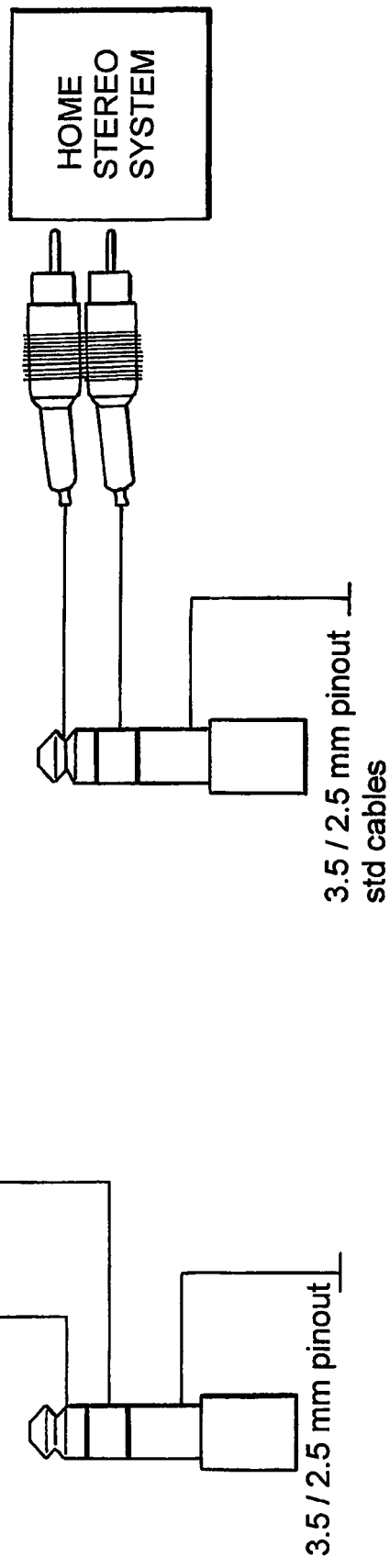
*Fig. 20*

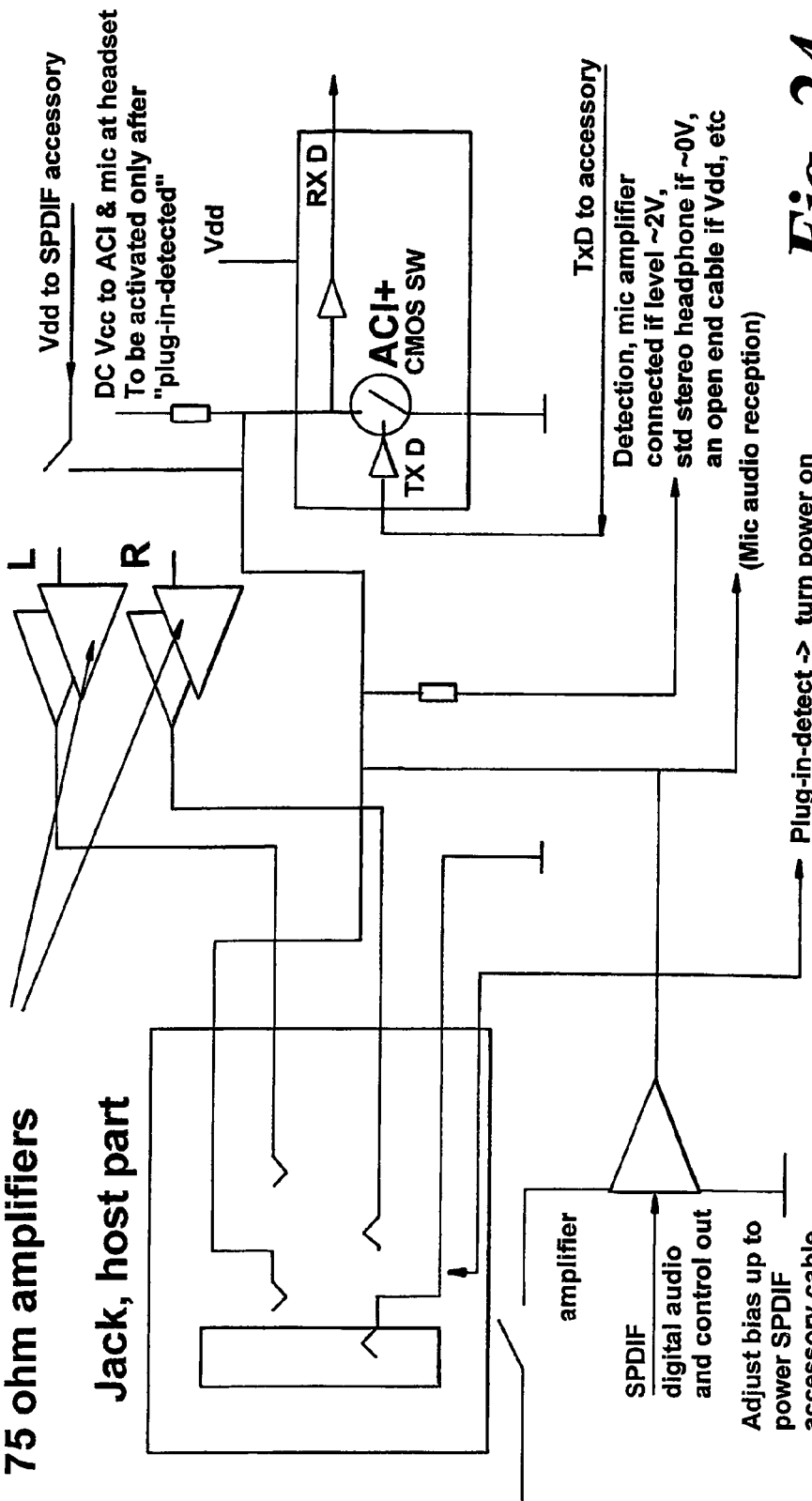

Engine Side - option for digital audio and S-video

Buffer audio amplifiers, plus - minus powered,
Output referred to GND, can drive 16 ohm headphones Optional S - video out
75 ohm amplifiers Vdd to SPDIF accessory DC Vcc to ACI & mic at headset
To be activated only after
"plug-in-detected"

Vdd

RX D

ACI+
CMOS SW

TX D

TxD to accessory

Detection, mic amplifier
connected if level ~2V,
std stereo headphone if ~0V,
an open end cable if Vdd, etc

L
R

LED or laser & DETECTOR

SPDIF Rx

Mic audio reception

Jack, host part

Optical fiber out inside the round plug - IN OR OUT amplifier

Plug-in-detect -> turn power on

OPTICAL SPDIF Tx
digital audio
and control out

*Fig. 25*

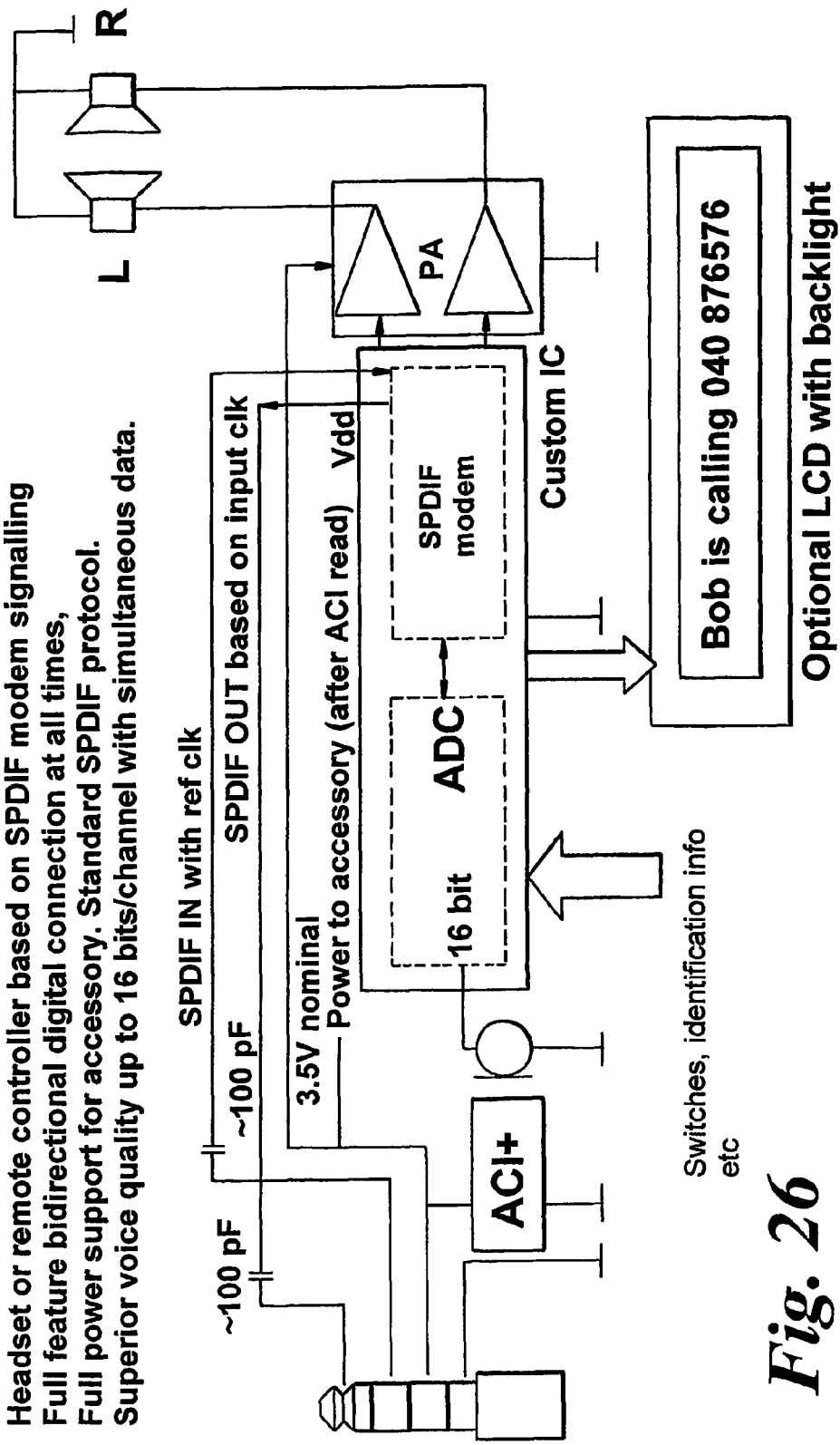

| Type | Image | Ø mm | Poles | Tip | Ring 1 | Ring 2 | Sleeve | Add #1 | Add #2 | Use Cases | Additional connector | 1 | 2 | 3 | 4 | Add. Use Cases |
|---|---|---|---|---|---|---|---|---|---|---|---|---|---|---|---|---|
| Nokia Janette |  | 2.5 | 4 | Ear + | Mic + | Ear - | Mic - | | | Headset | | Ear + | Mic + | Ear - | Mic - | Janette Headset |
| Nokia 5510, N-Gage |  | 2x 2.5 | 3 | Ear L+ | Ear R+ | Ear LR- | | | | Headphones | Round 2.5 mm | ACI | VOut | Mic + | Mic - | Headset, Nokia enhancements |
| Nokia Nemo W |  | 3.5 | 3 | EAR L | EAR R | GND | | | | Headphones | Fingers | | | | | |
| CDMA operators |  | 2.5 | 4 | Mic | EAR R | EAR L | GND | | | Mono/Stereo Headset | | | | | | |
| Japanese operators |  | 2.5 | 6 | Mic | EAR L | GND | EAR R | Stereo detect | Switch | Headset, Stereo Out | | | | | | |
| Stereo headphones |  | 3.5 | 3 | EAR L | EAR R | GND | | | | Headphones | | | | | | |
| Sharp portables |  | 3.5 | 4 | Ear L+ | Ear R+ | Ear L- | Ear R- | | | Headphones | | | | | | |
| Panasonic camcorders |  | 3.5 | 4 | EAR R | GND | TV Out | EAR L | | | Stereo/Video Out | | | | | | |
| Sony camcorders |  | 3.5 | 4 | EAR L | TV Out | GND | EAR R | | | Stereo/Video Out | | | | | | |
| Apple iPod |  | 3.5 | 4 | EAR L | EAR R | GND | TV Out | | | Headphones, Stereo/Video Out | | | | | | |
| Sony - E T910 phone, 2.5 mm |  | 2.5 | 4 | EAR L | EAR R | Mic, key | GND | | | Headset, Headphones, button | | | | | | |
| Nokia AV 2.5 / 3.5 mm |  | 3.5 2.5 | 4 | EAR L line in FM anten | EAR R line in FM anten | Mic, ACI, TV Out | GND | | | Headset, Headphones, Stereo/Video Out FM antenna, Analog recording SPDIF | | | | | | |

*Fig. 32*

DETECTION, IDENTIFICATION AND OPERATION OF PHERIPHERALS CONNECTED VIA AN AUDIO/VIDEO-PLUG TO AN ELECTRONIC DEVICE

FIELD OF THE PRESENT INVENTION

The present invention relates to the field of electronic devices which comprise audio/video (A/V) jacks, and associated methods of operating such devices. The electronic devices may or may not comprise mobile telephone functionality.

These jacks are adapted to house and provide releasable connection with A/V connectors/plugs. These plugs provide an end-termination for cabling and are used to connect a peripheral device to the electronic device. In this way, the electronic devices are able to output A/V and receive A/V input. Such A/V plugs are often call round standard connectors. The peripheral device may itself be comprised with the cabling, e.g. a microphone as shown in FIG. 31A, or another free end of the cabling may be used to connect to the peripheral device e.g. a A/V cable used to connect a TV to a camcorder.

Specific embodiments of the present invention relate to electronic devices which comprise four-contact jacks for connection with appropriate adapted plugs. Such jacks also can retain compatibility with standardized three-contact plugs.

Specific embodiments of the present invention also relate to electronic devices which comprise three-contact jacks for connection with appropriate adapted plugs. Such jacks also can retain compatibility with standardized four-contact plugs.

BACKGROUND TO THE PRESENT INVENTION

Standardized A/V plugs and jacks are frequently used in consumer audio and telecommunication products. A/V plugs are familiar to most people, with the typical A/V plug comprising a series of electrically isolated cylindrical segments ending in a "tip" segment. More particularly, the body of the plug usually includes a sleeve, a ring, and a terminating tip, each providing contact points with the jack. These plug "contacts" are often referred to as poles.

While now commonly used in A/V applications, the sleeve-ring-tip plug nomenclature derives from the time when similarly styled plugs were used by operators of the early telephone switchboards. Indeed, such plugs commonly are referred to as "phone" plugs, although they are most commonly used in A/V applications, such as traditional domestic stereo and video equipment.

Many manufacturers, such as SWITCHCRAFT™, make standardized 2.5 mm and 3.5 mm audio plugs and jacks. Some of the most common uses for A/V plugs include termination of headphone/headset cables, microphone cables, guitar cables etc. A/V plugs are commonly used for both stereophonic and monaural devices.

For example, a stereo headset (FIG. 30A), such as might be plugged into a portable audio device (e.g. an MP3 player), typically includes an audio-plug terminated cable. In a common electrical configuration for stereophonic peripherals, the left speaker is wired to the plug tip, the right speaker is wired to the plug ring, and the plug sleeve serves as a ground connection (FIG. 30B). Of course, the audio device includes an audio jack with internal contacts arranged to selectively contact the sleeve, ring, and tip of the inserted plug (FIG. 30B).

Telephone headsets (FIG. 31A), as commonly used for telephony applications, do not require stereo sound, (although stereo audio may be used). Such headsets typically comprise a monaural speaker for audio output and a microphone for audio input. Again, the headset cable is typically terminated by a standardized 3-contact audio plug (FIG. 31B), with, for example, the microphone wired to the plug tip, the speaker wired to the plug ring, and headset ground wired to the sleeve of the plug (FIG. 31C). Again, the corresponding audio device will include a standardized audio jack that includes the appropriately arranged internal contacts.

Because the sizes and typical wiring schematic for such audio plug and jack combinations are relatively standardized, cross-manufacturer compatibility exists. For example, a headset manufacturer that adopts an industry standard audio plug for its various headset models can be relatively assured that those headsets will be compatible with audio devices from other manufacturers. Thus, there are significant advantages if manufacturers use standardized plug and jack configurations.

Although there are standards for these plugs, there are very many types of plugs, which can, depending on the function of the peripheral device for which they provide end-termination, each provide varying degrees of functionality for the electronic device. Although outwardly plugs may appear the same, the signalling down the plugs vary according to the functions that the peripheral device provides (FIG. 32)

SUMMARY OF THE PRESENT INVENTION

According to the invention, there is provided an electronic device comprising a jack arranged to receive a peripheral device A/V plug, the A/V plug providing an end-terminal for a peripheral device to be connected to the jack, wherein the device is arranged to detect insertion of the A/V plug, and upon detection of insertion, discriminate the functionality provided by the peripheral device.

In this way, the device is able to provide compatibility, including backward compatibility, with most peripheral devices which use an A/V plug.

For example, the device would be able to discriminate between peripheral devices providing different functionality, even though the plug which is inserted may, on the face of it, look the same as that for another peripheral device which provides different functionality.

The device may comprise memory containing configuration details of a plurality of A/V plug-peripheral device configurations and associated peripheral device functionalities, and wherein the device is arranged to use the configuration details to discriminate the functionality of the peripheral device connected by the inserted A/V plug.

The device may be operable to select appropriate applications software for the electronic device based on discriminated functionality.

The device may actually identify the functionality and discriminate that the device does not support the functionality provided by the peripheral device.

The device may not be able to discriminate down to one particular peripheral device and associated functionality type. The device may be arranged to discriminate a shortlist of two or more possible peripheral devices which may have been connected, and provide the user with the option of selecting one or more of the discriminated peripheral devices from the discriminated shortlist to provide the functionality of the selected peripheral device.

The device may be operable to determine the configuration details of the peripheral device. The configuration details may include arrangements of characteristics including impedance, capacitance, voltage, current and the presence of a short circuit.

The device may be operable to measure characteristics at one or more contacts of the A/V plug. Further, the device may be operable to measure the characteristics at two or more contacts sequentially following or during insertion of the A/V plug.

The device may be operable to detect an external voltage applied by a self-powered peripheral device, for example a carkit.

The device is operable to determine whether the peripheral device provides analogue functionality. Additionally or alternatively, the device may be operable to determine whether the peripheral device provides digital functionality.

The device may be operable first to determine whether the peripheral device provides digital functionality. Alternatively, the device may be operable first to determine whether the peripheral device provides analogue functionality.

An interrupt signal may be generated upon insertion of the plug into the jack, identification of the functionality provided by the peripheral device commencing in response to the interrupt. The interrupt signal may be generated by the electronic device itself or by the peripheral device, and may include slopes arranged such that the signal is inaudible in the phone audio uplink. This makes data transition non-audible (no "pops" or "clicks"). However, short interrupt (mute) is present in the audio channel=uplink.

Additionally or alternatively, the device may include a sensor arranged to detect insertion of the plug into the jack.

The device may be arranged to receive information from the peripheral device to discriminate the functionality provided by the peripheral device, for example where the peripheral device makes use of ECI (Enhanced Control Interface) or ACI (Accessory Control Interface).

The device may comprise a processor, and the processor may be arranged to detect insertion of a A/V plug, and upon detection of insertion of the A/V plug, the processor is arranged to test the configuration of the peripheral device to discriminate its functionality.

By determining the configuration of the peripheral device, the device is able to identify which connection path should be used for which type of signalling (e.g. ring next to tip is for R analog voice or S-video or SPDIF in one particular embodiment, but not another).

The device may comprise a memory and a processor, the memory comprising configuration details of a plurality of plug-peripheral device configurations and associated peripheral device functionalities, and wherein the processor is arranged to detect insertion of a A/V plug, and upon detection of insertion of the A/V plug, the processor is arranged to test the configuration of the peripheral device to discriminate its functionality.

The device may comprise a memory and a processor, the memory comprising configuration details of a plurality of plug-peripheral device configurations and associated peripheral device functionalities, and wherein the processor is arranged to detect insertion of an A/V plug, and upon detection of insertion of the A/V plug, the processor is arranged to test the functionality of the peripheral.

The discrimination, determination, identification and functions outlined above can be performed by using one or more processors, switches, and associated electronic circuitry. A switch may be used to detect insertion.

In another aspect, the present invention provides an electronic device comprising a jack arranged to receive peripheral device A/V plug, the A/V plug providing an end-terminal for a peripheral device to be connected to the jack, wherein the device comprises one or more connection paths to connect to corresponding one or more contacts on the A/V plug, wherein the electronic device is configured to discriminate the configuration and functionality provided by a peripheral device and arranged to route the signalling down one or more of the connection paths to provide appropriate signalling to one or more of the A/v plug contacts according to the configuration/functionality discriminated for the peripheral device.

So, for example, when one particular peripheral device is plugged in, signalling routing is adapted to provide the appropriate signalling for the particular peripheral device that has been connected. When another particular peripheral device is plugged in, signal routing is adapted for the particular different peripheral device which has been connected.

Switches under the control of one or more processors may be employed in the routing. Software may be used to route the signalling accordingly with or without the use of switches.

Amplification of signalling may also be used to appropriately adapt the signalling for a particular functionality/configuration of a particular peripheral device.

The present invention encompasses one or more of the above aspects and embodiments in all compatible combinations. Corresponding methods and computer programs are also within the scope of the present invention.

DESCRIPTION OF FIGURES

Specific embodiments of the present invention will now be described with reference to the following figures in which:

FIG. 1 shows pull-up characteristics of a detection system according to one embodiment of the present invention;

FIG. 2 shows a video or some other cable identifier;

FIG. 3 shows detection ranges for use, for instance, in video cable and simple carkit cable detection;

FIG. 10 is a table of interrupt cases;

FIG. 11 shows an S-video interface;

FIG. 12 shows the superimposition of data onto a supply voltage;

FIGS. 15-29 show aspects and embodiments of the present invention in which the same jack is used to provide connectivity to a variety of different plug types with corresponding different functionality;

FIG. 32 shows prior configurations for signalling in a variety of A/V plugs which are compatible with one or more aspects and embodiments of the present invention. In addition, FIG. 32 shows a Nokia AV plug, which can be a standard 2.5 or 3.5 mm plug. However, the signalling shown in the Nokia AV plug varies according to the discriminated functionality of the peripheral device. So, according to one or more aspects/embodiments of the present invention, ring 3 can be used to send microphone/TV out signalling depending on the peripheral device which is connected. Thus, although the Nokia AV plug may be a standard plug; the jack of one or more aspects/embodiments of the present invention routes the signalling down the contacts according to the functionality which is discriminated.

DESCRIPTION OF SPECIFIC EMBODIMENTS

Figure 4:
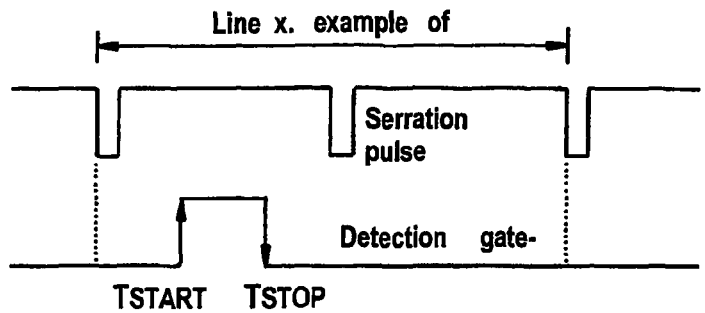
FIG. 4 shows a detection arrangement for AC-coupled and DC-coupled load.

The electronic device of the invention includes a jack arranged to receive a peripheral device A/V plug.

The jack is arranged to receive A/V plugs having three contacts, designated as a tip, a ring and a sleeve; four contacts, designated as a tip, a first ring, a second ring and a sleeve; and no contacts, in which case the plug includes a non-conductive material, the plug being shaped as other A/V plugs and carrying an optical fibre.

The A/V plug may be a 2.5 mm or 3.5 mm diameter plug, for example. The A/V plug provides an end-terminal for a peripheral device to be connected to the jack. Numerous forms of peripheral device are in common use, examples including stereo headphones, stereo headsets, and remote controls.

The electronic device is arranged to detect insertion of an A/V plug. Insertion is detected by an electrical or mechanical sensor located at the entrance to the jack, or within the jack.

Upon detection of insertion, the electronic device differentially identifies the functionality provided by the peripheral device. Methods whereby the device identifies the functionality are described in detail below, in relation to the "Nokia AV" plug configuration shown in FIG. 32.

The device includes a memory containing configuration details of a plurality of A/V plug-peripheral device configurations and associated peripheral device-functionalities. The device is arranged to use the configuration details to identify the functionality of the peripheral device connected by the inserted A/V plug, for example by the use of a controlling processor and appropriately adapted hardware. The memory may be comprised with, or external to, the processor which controls the identification of the functionality of the peripheral device.

As a general example, the memory may contain details of the impedance expected when analogue headphones are connected to the device by the A/V plug and jack. The device is operable to measure the impedance at a particular contact of the plug, and compare the measured impedance with the expected impedance stored in the memory, in order to determine whether or not the peripheral device is a analogue headphone or a particular analogue headphone.

The device may not be able to measure a sufficient number of parameters in order to make a precise determination of what the peripheral device is. In these cases, the device presents a menu containing a reduced list of options to the user, who is then able to select an option corresponding to the peripheral device, which he has connected. It may be the case that several possibilities can be ruled out based on the measurements taken by the device.

Once the functionality of the peripheral device has been identified, the device can be arranged to automatically select the appropriate applications software based on the identified functionality. Non-compatible applications software may be indicated as such, for example, by preventing selection by the user whilst the particular AV plug is inserted.

Identification
Detection Elements

The detection system according to the invention includes different pull-up voltages and resistors. The ADC measurement ranges, in the example circuitry, is 0-1.35 V and interrupt threshold 0.5-0.7 V. Additionally, a data switch may be used that directly shorts the line.

FIG. 1 shows various pull-up characteristics of the detection system.

Video Cable Detection

The following principal detection ideas have been identified:

A) ECI circuit in the cable. The cable needs low-impedance analog switch ECI system and video detection. The video detection is needed to synchronize the video switch and identification. A time out is needed to disable the switch. After time out, an interrupt is generated to inform the host that the load is disabled. If the system is facing low impedance, it recognizes that the phone is still having video buffer load and the time counter is reset. If there is a response, the host has control. If there is no response, the accessory expects that it is disconnected.

B) A resistor in the cable can be used but remains as the load all the time, thus consuming power. If the source impedance is corrected with a serial resistor, the situation is even worse. The resistor value should be such that it is not making Microphone/TTY (TTY is a teletype equipment comprising a keyboard and a display for the hearing impaired) recognition and also below the interrupt threshold leading to a range of 300Ω . . . 600Ω. This may consume too much video power and thus may not be feasible. The detection does not work when the TV-end is mated. This kind of resistor could, however, be used to indicate specific headphones having no signal in the microphone line.

C) A band-gap reference diode application gives the best detection capability. A micro-power voltage reference diode LM285 has a voltage of 1.235 and the tolerance is 1%, 2% or 3%. Even if ESD resistors are used in series (2×50Ω) the voltage stays in the ADC range. The voltage stays in the specified range with 10 μA to 20 mA current. If the voltage is measured with two different pull-up resistors, the current is changing but the voltage stays stable. In this way, the resistive load can be separated and the detection is reliable. The video max voltage needs to be limited to 1.2 V, which is advantageous due to power consumption. The standard video signal is 1 Vpp±3 dB, but in this case −3 dB . . . +1.5 dB needs to be defined. This detection is not active when the TV-end is mated.

FIG. 2 shows a video cable identifier.

FIG. 3 shows detection ranges for use in video cable detection.

It should be noted that the interrupt pulse is valid from 0 V to 0.5 V and the higher value has a tolerance of up to 0.7 V.

TV-Cable with Serial Capacitor

The AC load detection needs to be taken into account. In an integrated circuit incorporating a system according to FIG. 4, there will be an embedded detection pulse that gives the possibility to detect a 75Ω load being DC coupled or AC coupled generally with a 470 μF . . . 2200 μF capacitor (that is currently obligatory in Japan).

With DC measurement the voltage depends on the time for which the bias is applied. The time constant is 1 s . . . 5 s. If the voltage is applied for too long, the voltage will be able the ADC range. The following elements are used:

Application of a bias for a certain time and measurements taken in certain short intervals.

Discharge of the capacitor rapidly with a data switch to initiate a new measurement cycle.

Setting of the pull-up to High-Z mode to detect the voltage being relatively stable during several successive measurements.

Video Load Detection

The detection has several phases and therefore the detection algorithm needs to identify a lot of different situations, which may mean temporarily erroneous detections. The detection is a combination of the above-mentioned elements. Cable detection (band-gap diode) identification improves reliability in addition to detection but the system must cope with standard cables.

Embedded AC-detection in the TV-signal can be used if the video signal is used for identification (FIG. 4).

Video Signal Presence Detection Via Application

The video signal synchronization pulse on line 3 may have in the system an additional synchronised detection pulse, and the amplitude of this pulse is monitored in the TV-encoder block. This gives add-on data for the detection. For instance, when TV is changed to headphones in the adapter, there is no detection of the change the previously-described methods. This problem does not arise in the DC-measurement case with an embedded pulse.

FIG. 4 shows a detection arrangement for AC-coupled and DC-coupled load. Some data signals, including TV signals, have fixed pattern including "1" signal or equivalent. Having a synchronised pulse that can gate this signal level will enable detection of the signal. In addition, in impedance terminated interface signals, the mating adds load from the accessory termination that halves the impedance and hence this can be measured as voltage change. With AC-coupled load the measurement expects that the video content is kept constant (e.g. black) during measurement and that the time is adequate for charge stabilization. The DC-coupled case works any time and can easily detect a change in the loading.

The AC algorithm needs longer integration time as the average DC is slightly affected from the coupling.

If detection is not possible using the detection system of the invention, in this case or in any other, a menu is presented to the user, whereby the user can select the functionality of the peripheral device. The menu includes limited options, with several possibilities having been ruled out following the partial identification.

Other Detection Systems

Simple Accessory Detection without ECI/ACI

The detection can be made with voltage measurements in the mixed signal IC (integrated circuit). In this example, the usable AD converter range is 0 . . . 1.35 V, and 1024 steps represents about 1.3 mV accuracy per step. Other ranges can be used.

A TV-cable load that does not have a serial capacitor can be measured with the AD using, for instance, the ~2.2 k bias resistor and a supply of ~2.1 V. The measurement involves a serial resistor of about 50 ohms in the ASIP (i.e. Application Specific Integrated Processor is an integration technology incorporating, for instance, resistors and in this case the 50 ohm resistor is added to provide ESD (Electrostatic Discharge) protection) and 75 ohms load. The tolerances of the supply voltage and resistors make it difficult to perform exact load resistor measurement. It is difficult to separate 50 and 125 ohms without calibration in production. If it is adequate only to know that the load impedance is low, calibration can be avoided. The calibration improves detection performance and so it can separate other non-specified loads.

The same AD can be used to detect an accessory if it has in the microphone line a suitable voltage (0 . . . 1.35 V) that can be generated with a load resistor or external voltage source. A suitable external voltage source is available in carkits, for example. Use of external voltages requires microphone disconnection during measurement. The microphone bias needs to be disabled during measurement to allow for measurement of the external voltage without too much error. The external voltage could come from a low impedance source, allowing the measurement to be done in the microphone line with the bias supply point shorted. This system is sufficiently accurate to measure several voltage levels, i.e. from different accessories. Four levels can be detected with ±1.2% references and equivalent clearances. The measurement system uses interrupts from the host microphone mode. The accessory needs a comparator, a monoflop, a switch and a reference voltage source. The monoflop stage provides switching time for the reference voltage and this system has a stable period for measuring whereas other e.g. bistable based circuits arrangement potentially go to the wrong state caused by interferences. By detecting the presence of a microphone line bias voltage enabling control of the carkit can be provided. During measurement, the host bias needs to be disabled to prevent erroneous accessory identification in the case when a basic headset is inserted.

Figure 5:
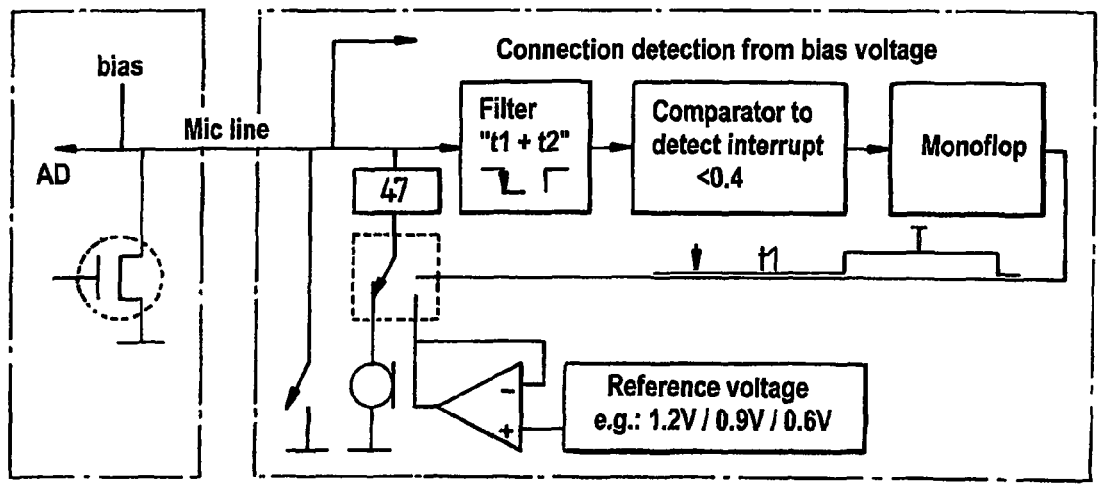
FIG. 5 shows a voltage detection circuit use, for instance, in video cable and simple carkit cable detection (as with FIG. 3)

FIG. 5 shows a voltage detection circuit for a sample carkit.

The basic accessory detection in the host side, depending on filtering time constant expects, for example, ~100 ms reset, done with the microphone bias connected to GND. During a period of 50 . . . 100 ms the accessory needs to deliver an identification voltage. A long interrupt filters separate ECI functions which use very short interrupt times. This allows the accessories to involve both systems. The long interrupt from the host needs to disable the ECI response and to provide basic system functionality instead. The host may incorporate either of these identification systems which will coexist. The basic system might be used in hosts which do not have a data mode but microphone mode only. The microphone mode allows the bias source to be connected to the bias voltage, GND, or alternatively, it can float. The microphone input needs to be connected to a hook-detector DA to provide for accurate voltage measurement.

Figure 6:
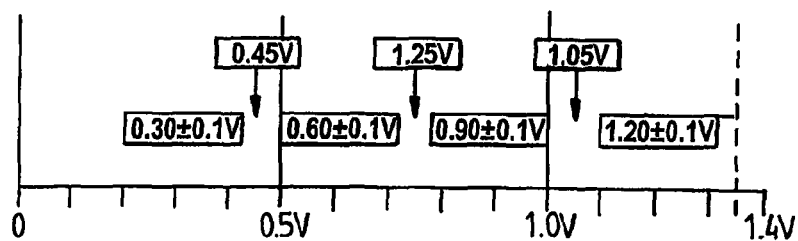
FIG. 6 shows detection voltage tolerances for the circuit of FIG. 5.

The detection voltage tolerances are shown in FIG. 6.

Figure 7:
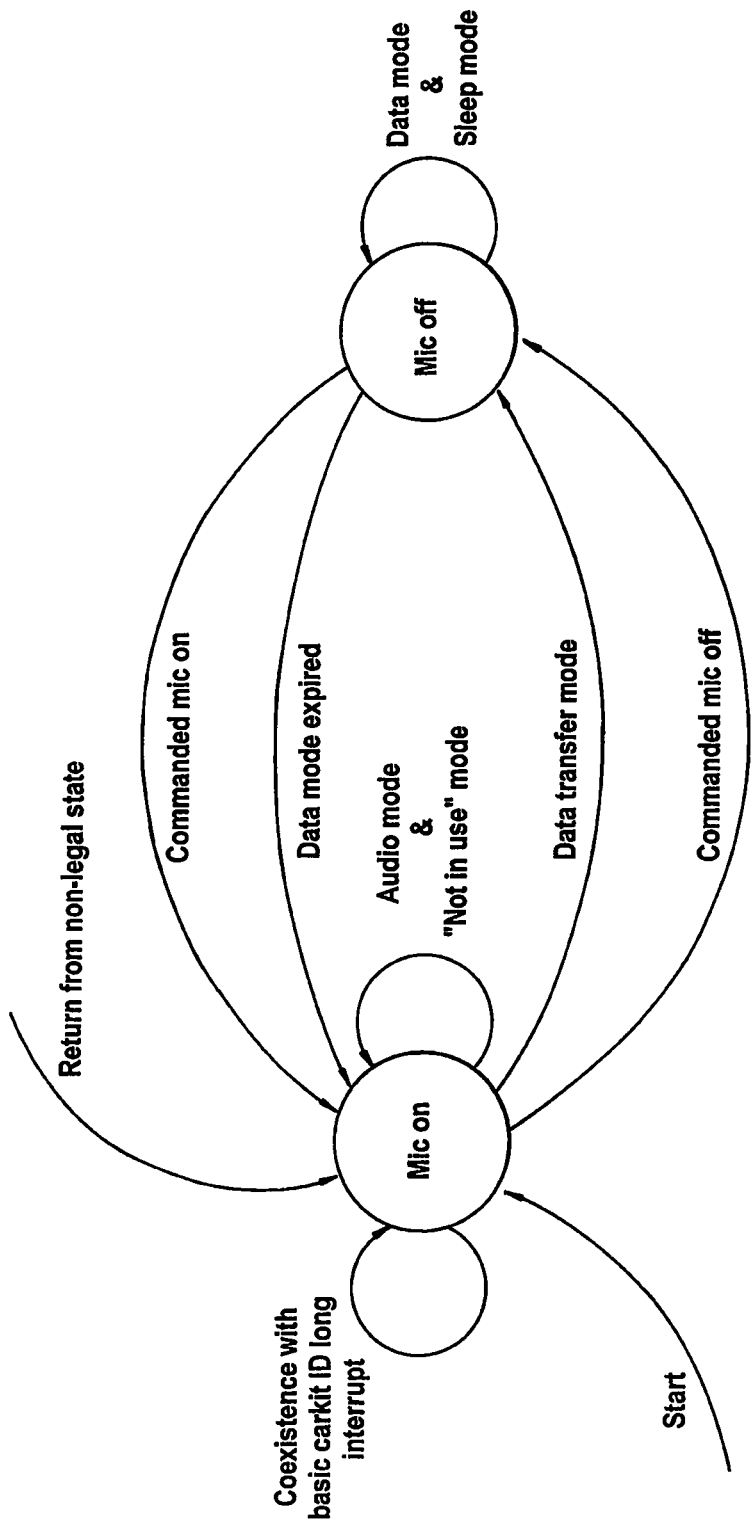
FIG. 7 is a state diagram showing coexistence of the carkit with an ECI system.

The coexistence of the basic carkit with the ECI system is shown in FIG. 7 (allows both systems to be used/operated).

Headphone Load Detection

Headphone amplifier TPA4411 (a headphone amplifier supplied by Texas Instruments) output R-line might be shorted by a mono headset plug. To prevent thermal shutdown serial resistors ~15 ohms are used as protection of the output lines, although these will reduce the efficiency of low-impedance headphones. The serial resistors help in the filtering of charge pump interferences which is advantageous also in ESD protection.

To increase efficiency, an R-channel load detector is used. This consists of a comparator and needs two GPIOs for operation, as it mutes the R-channel after detection. The R-channel mute is maintained until the plug is unmated. The circuitry expects some enhancement in the interference and ESD protection as the serial resistor sizes are reduced. Providing a proper low-frequency synthetic signal to the input when detecting the load enhances detection reliability.

Figure 8:
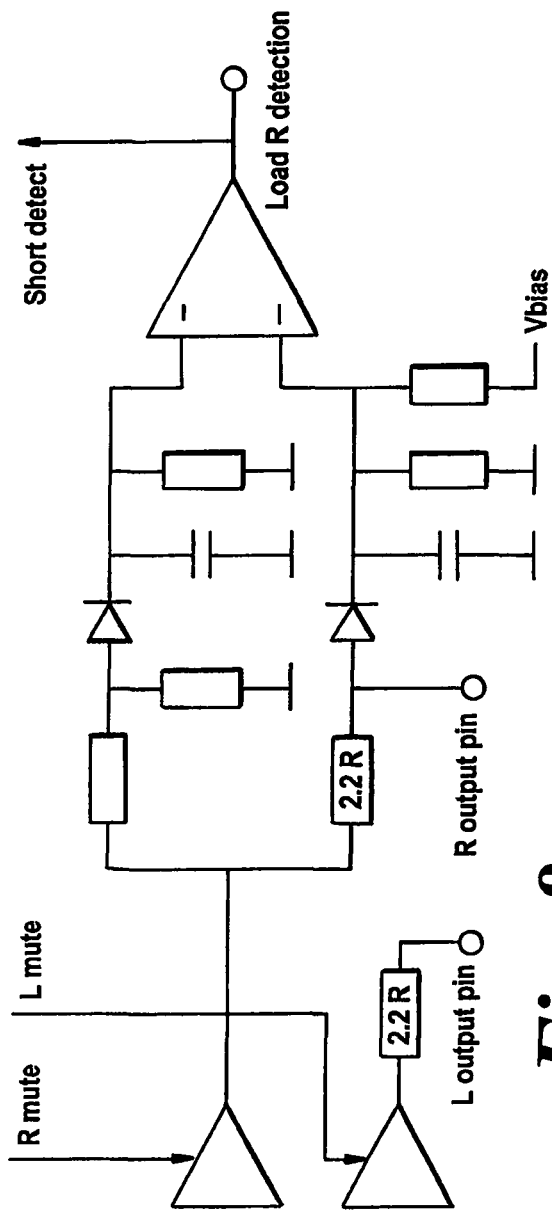
FIG. 8 shows a headphone load detection circuit.

FIG. 8 shows a headphone load detection circuit.

When the headphone impedance is measured with the aid of an ADC providing a current through a switched resistor, there exist tolerances from Vana, Rmeasurement and ADC offset. Vana is supply voltage, Rmeasurement is a pull-up resistor used in measurement being in series with the load during measurement, and ADC offset is measurement error. These all together create certain accuracy tolerance in the measuring. Measuring with the same Rmeasurement results in differential data that provides information on any non-balance and possible short circuit. Audible, even strong, click-sound from headphones is a disadvantage of this kind of measuring method. The mentioned disadvantage can be avoided by "soft" pulse having slope in the leading and trailing edge (this has also been mentioned in conjunction of the interrupt pulse).

Interrupt Signal

The ECI/ACI generates an interrupt and, when using a threshold detector as the slicer level, a signal level of <0.7 V is interpreted as an interrupt. To avoid unwanted interrupts, the microphone signal needs to be prevented from going low in any circumstances. One solution for this is a serial resistor. However, the resistor reduces gain by about 2 . . . 3 dB.

Figure 9:
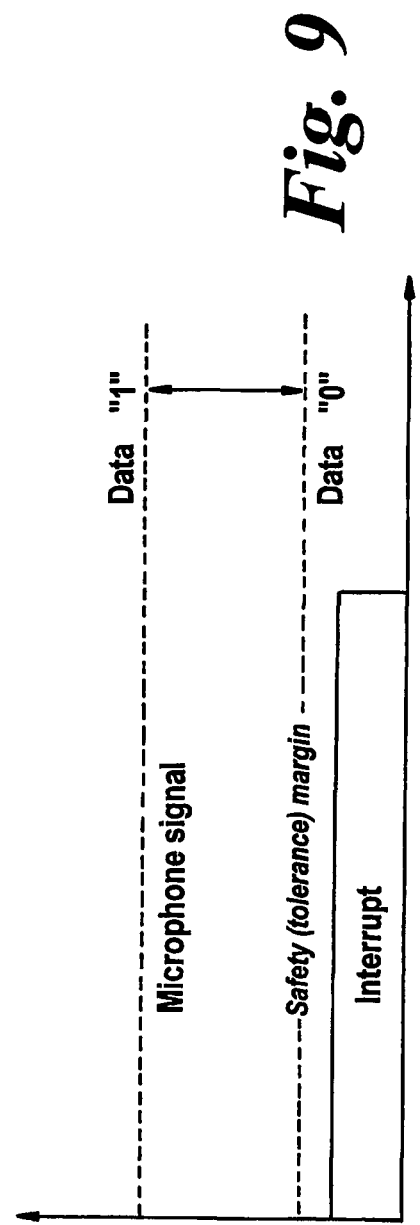
FIG. 9 shows an interrupt signal in comparison to a microphone signal.

FIG. 9 shows an interrupt signal in comparison to a microphone signal. When host (phone) makes an interrupt, the sound channel is first muted then an interrupt is created which starts data transfer to/from the accessory. After this transaction, sound channel operation is restored. When the accessory makes an interrupt, it gives a "soft" interrupt, switches microphone off (removes disturbing signal and gives also more current for the ECI), the host mutes sound after interrupt detection, and makes data transfer to/from the accessory. The accessory is then connected to the microphone and the host restores sound channel operation.

Interrupt and mic switching order and one possible method to minimise the pop-sound: Off=Interrupt soft falling slope—Mic off—interrupt (>65 μs fixed)—slow slope up Host makes mute after interrupt detection (processing time<3 ms). On=Mic on—Host releases mute.

FIG. 10 is a table of interrupt cases.

S-Video Interface

The system has a requirement for S-video and stereo sound signals output. To serve standard TV-receivers, interfacing analog audio signals are expected. To transfer the data through 3 lines, digital audio is expected. The digital galvanic audio signal has a problem relating to the interface with the video. Additionally, power is needed for the circuitry that converts audio to analog signals. There is no standard arrangement in this case to power the accessory from the phone. If optical signals are applied instead, a line for powering is available. The powering line provides identification with ECI, before the system is latched to provide power to the accessory until the plug is disconnected. A sleep mode may be provided that is under SW control and unpowers the accessory when needed.

FIG. 11 shows an S-video interface.

Another solution is to superimpose the high-frequency data onto the supply voltage. The separation coil may be very bulky and this solution may not be considered so advantageous.

FIG. 12 illustrates the superimposition of data onto a supply voltage.

In the case of a mobile phone, the detection procedure starts from the detection of plug insertion or an interrupt pulse, and includes one or more of the following.

1. The mic line bias is used for ECI powering/"Stealing of power from the low voltage bias. Bias is connected with a serial resistor from supply voltage to microphone. The serial resistor works as load resistor and microphone signal is so present as voltage over this resistor typically 2.2 k ohms. Microphone takes typically 250 uA bias current and up to 150 uA DC current is so available for ECI ("stealing"). There is a diode rectifier and a big smoothing capacitor to avoid interference to the microphone audio signal. In ECI sleep state, the current is about 10 uA meaning that the smoothing can be done more efficiently. When data transaction is made, the microphone load is switched off giving full 400 uA load current for ECI so that the active mode current need can be served. The active mode also uses stored charge voltage in the smoothing capacitor.

2. The interrupt signal that starts the identification process may be initiated by the accessory or by the phone-terminal and includes microphone switching to remove the mic load and signal. The interrupt signal creates a data mode to both ends for the required time period.

3. The interrupt signal includes slopes which make the pulse inaudible in the uplink. The interrupt is sent during audio and the phone audio uplink is muted while the interrupt is made inaudible using a slow rising and falling interrupt signal 4. Accessory load detection using selectable pull-up resistance and voltage, and voltage or current measurement, (for example, Standard headphones>shorted mic pin, Headphones>100 uA current consumption (which means 5 k . . . 10 k load detection), SPDIF or TV-load>75 ohms).

5. Accessory detection using capacitance measurement in the load by applying a voltage pulse and measurement (see TV-cable with serial capacitor above) the resulted voltage. /TV interface detection having capacitor in series.

6. Accessory measurement by detecting an external voltage from a self-powered accessory that may have different voltage levels to other accessories (for example, simple carkit detection using an interrupt to identify a voltage that indicates the carkit type).

7. Accessory detection by measuring voltage with different current values (using different resistors), (e.g. video cable detection without load=TV end connected having the voltage set to a higher level than TV signal by using, for instance, a bandgap regulator). For accessories which do not have a mic line in use, like headphones, different types may be detected by having different zener voltage zener diodes as identifiers.

8. Short circuit detection, or voltage measurement or load current measurement.

9. Accessory detection using a photodetector arranged to receive an optical signal.

Figure 13:
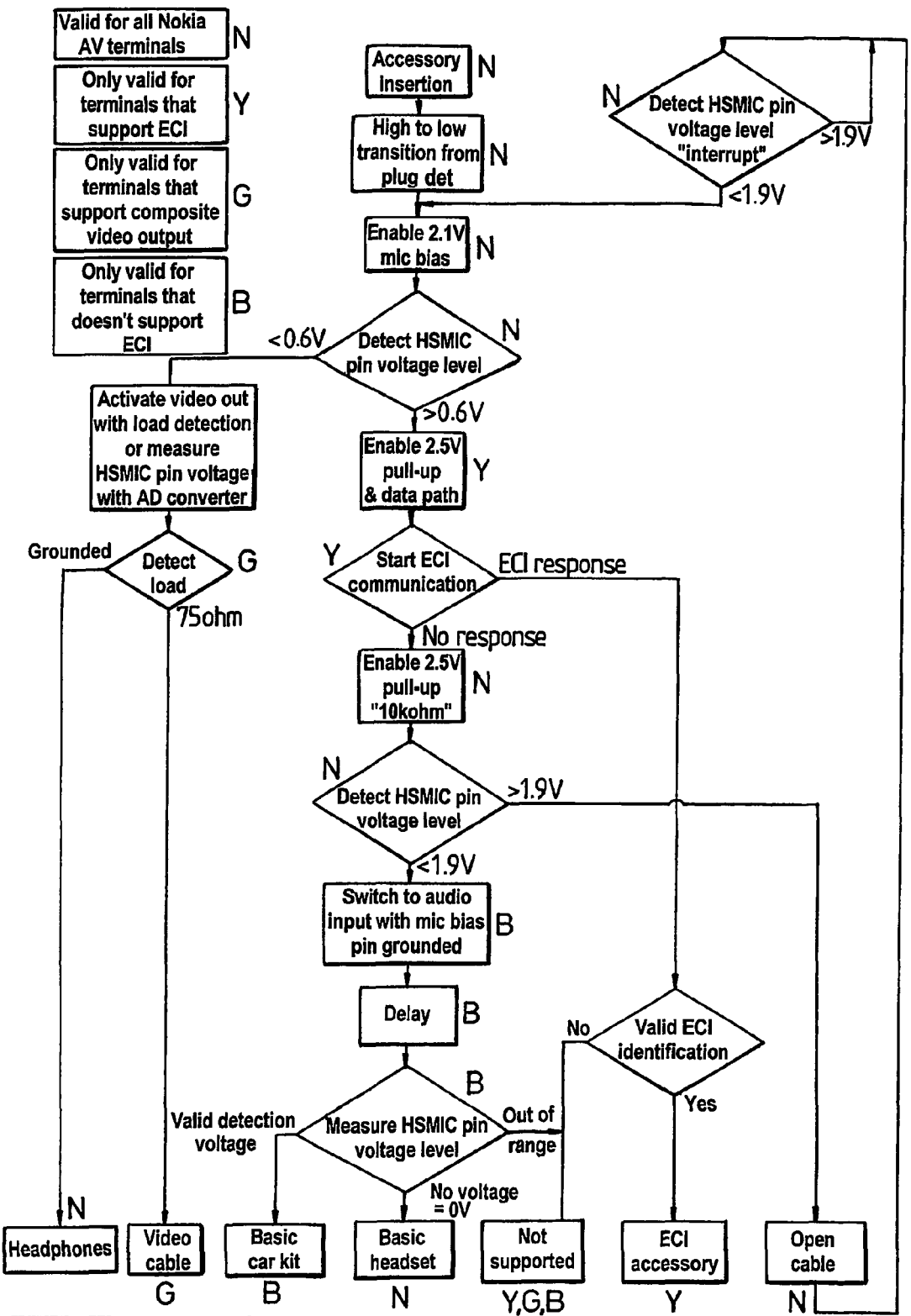
FIG. 13 provides a flow chart illustrating detection steps which could be performed in Nokia mobile phone terminals.

FIG. 13 shows a flowchart which illustrates automatic detections steps which can be used to detect functionalities provided by a variety of different A/V plugs. Each box in the flowchart has a key against it; N, Y, G and B. The key indicates that the box is valid for particular types of terminals. So, for example, the N key indicates steps which could be performed for all existing Nokia A/V terminals (electronic device), the Y key indicates steps which could be performed for terminals that support ECI, the G key indicates steps which can be performed for all terminals that support a composite video output, and the B key indicates the steps which could be performed for all terminals that don't support ECI. The term HSMIC is an abbreviation for handset/headset microphone.

Figure 14:
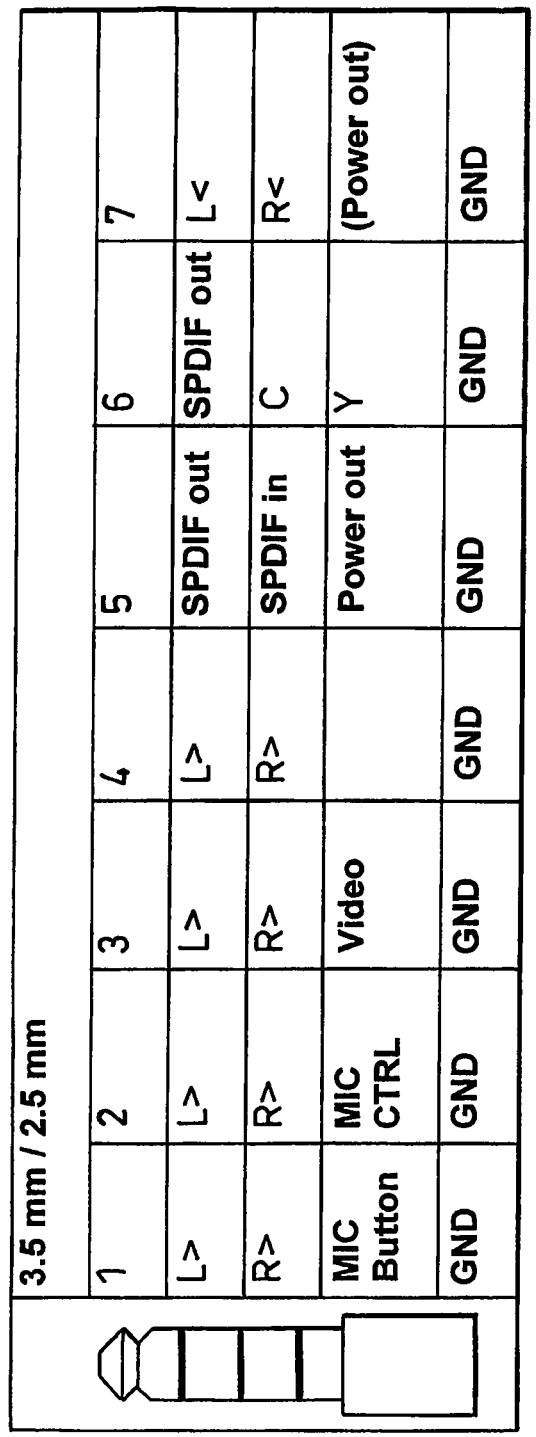
FIG. 14 shows plug arrangements.

The detection steps outlined in FIG. 13 are compatible with the seven plug arrangements shown in FIG. 14. They may also be compatible with other plug arrangements. For example, the detection steps outlined in FIG. 13 are also compatible with the following plug arrangements not shown in FIG. 14.

In the case of a 4-pin system functionality counted from tip:
Basic stereo headset: L/R/Microphone/Common Ground
Mono headset: Mono/NOT connected/Microphone/Common Ground
In the case of a 3-pin system functionality counted from tip:
L/R/Long Common Ground (of 2 positions)
In a 2-pin system functionality counted from the tip:
Mono/very long Common Ground (of 3 positions)

Although automatic detection systems have been described above, one or more embodiments and aspects of the present invention can incorporate manual detection i.e. a user can be involved with the selection of the peripheral device type and the corresponding functionality. So, for example, upon detection of insertion, a user may be provided with a list of devices which are compatible with the electronic device in terms of the functionality that they provide.

Aspects and embodiments of the present invention also provide an electronic device jack which can have multiple use cases (FIGS. 15-29). These embodiments may or may not include the automatic/manual detection systems disclosed in this patent specification (or any variation or subsequent development).

Figure 15:
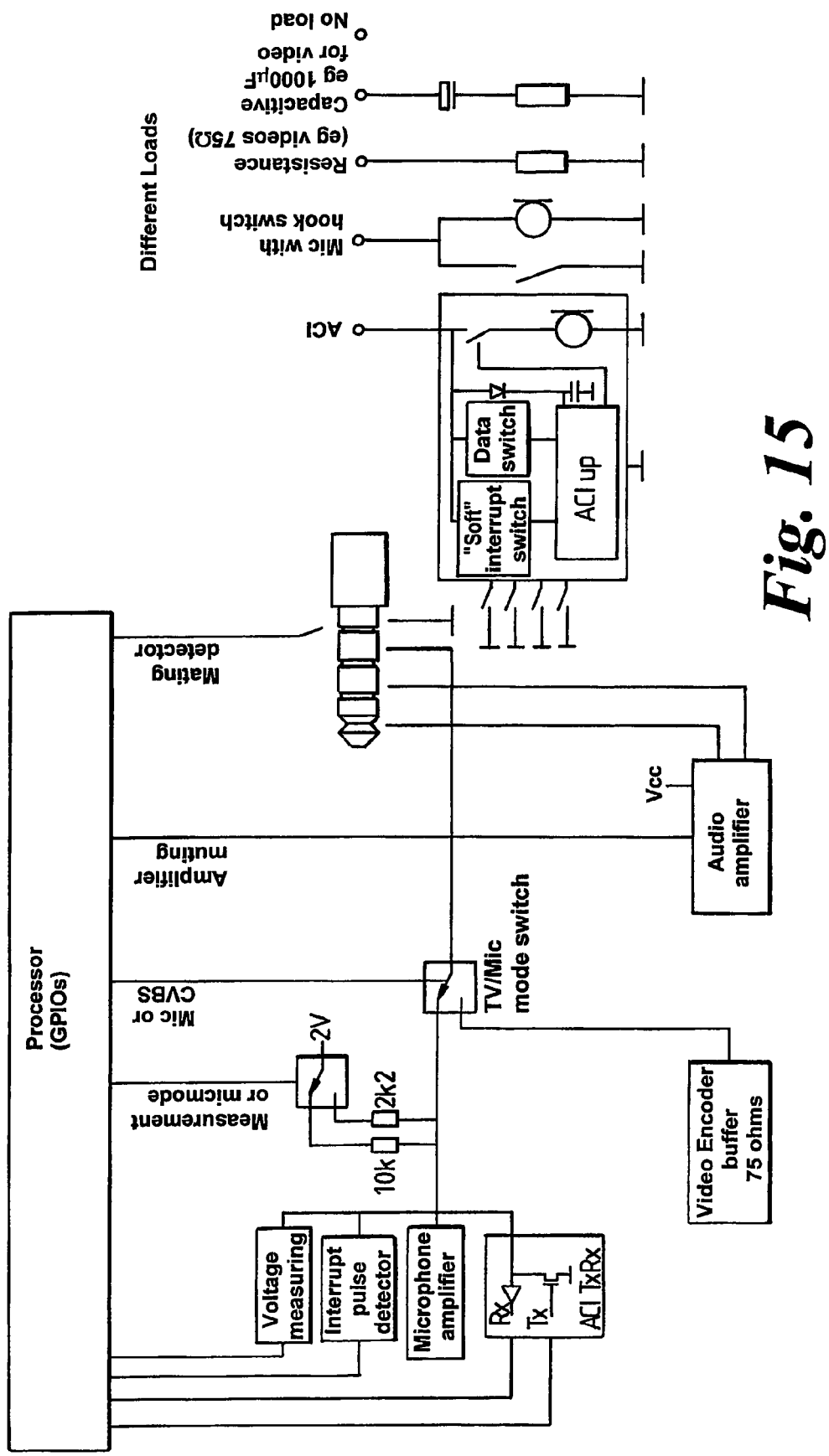
Figure 17:
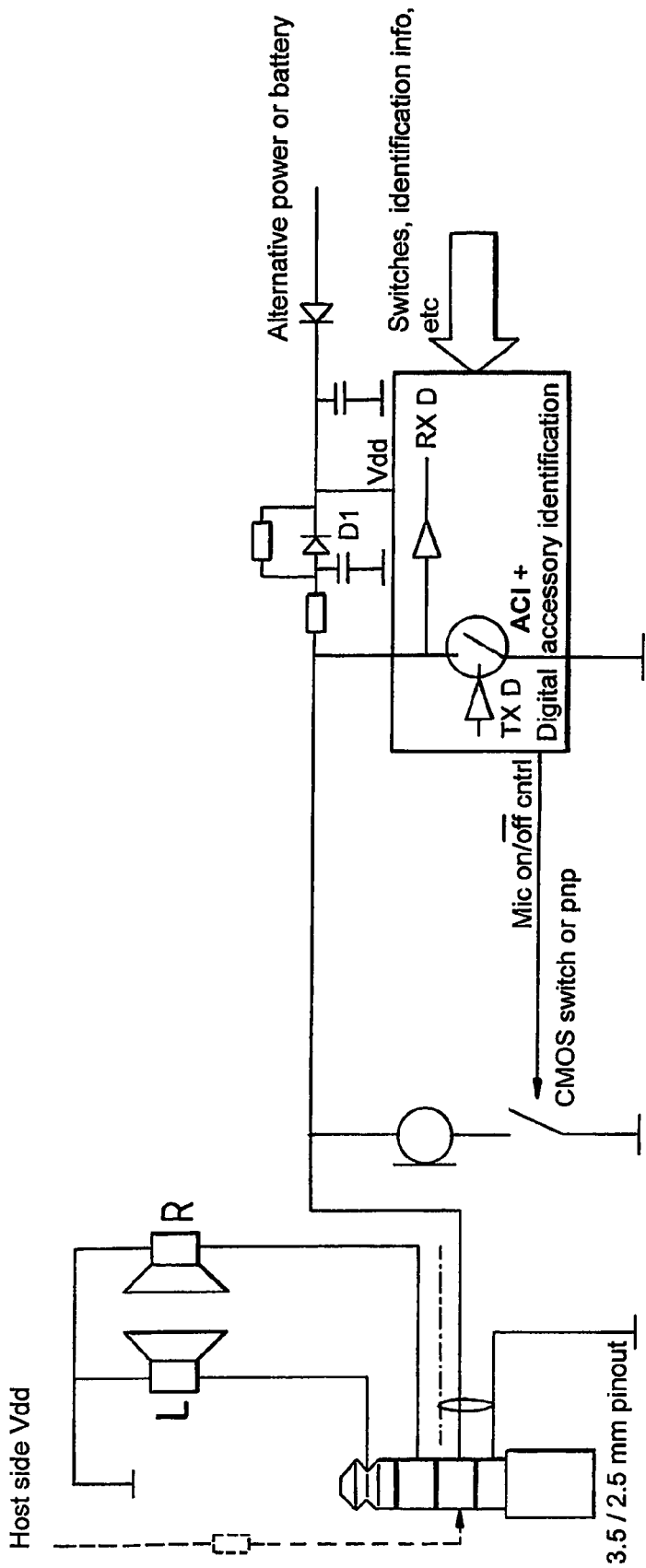
Figure 18:
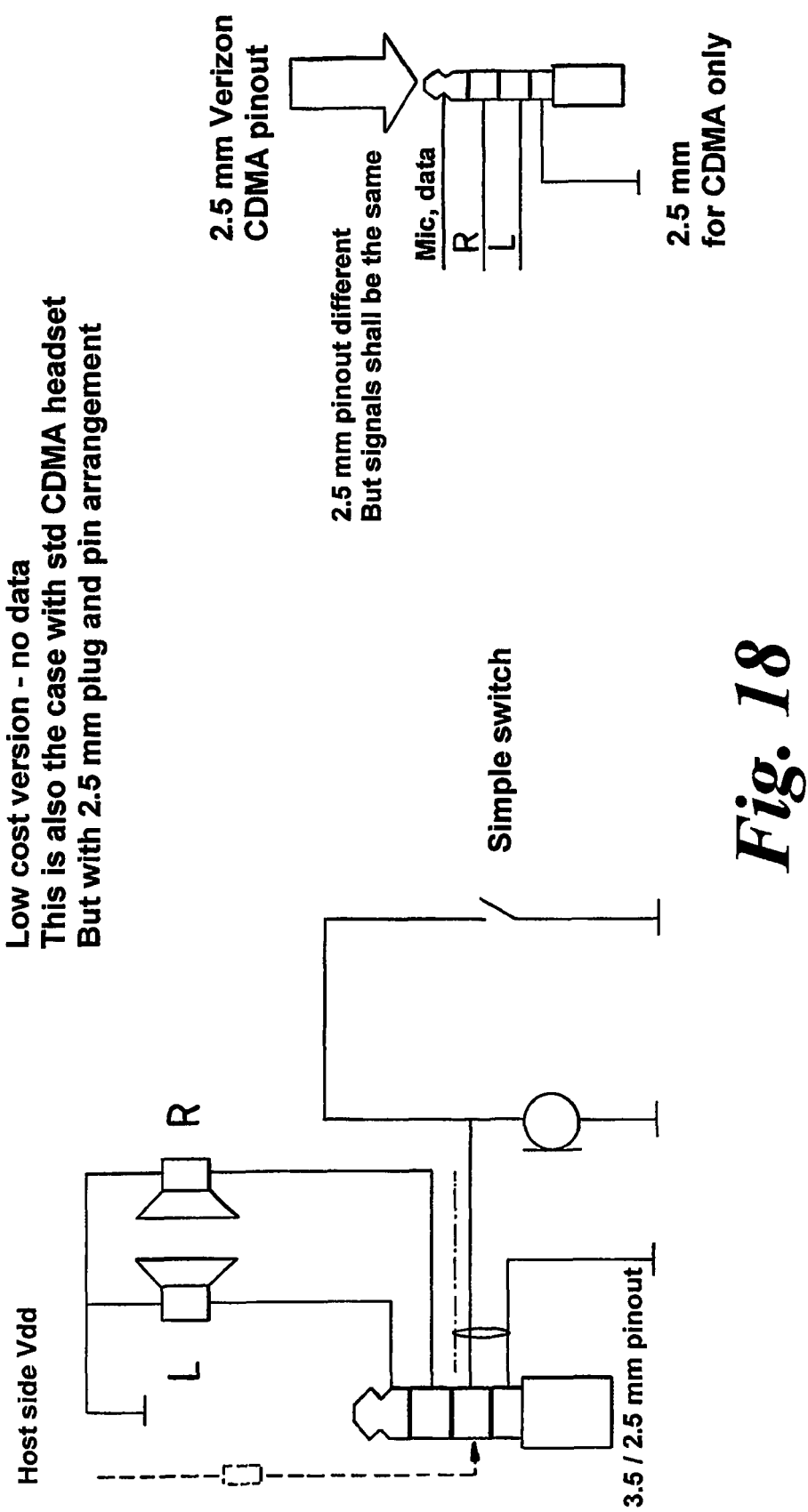
Figure 19:
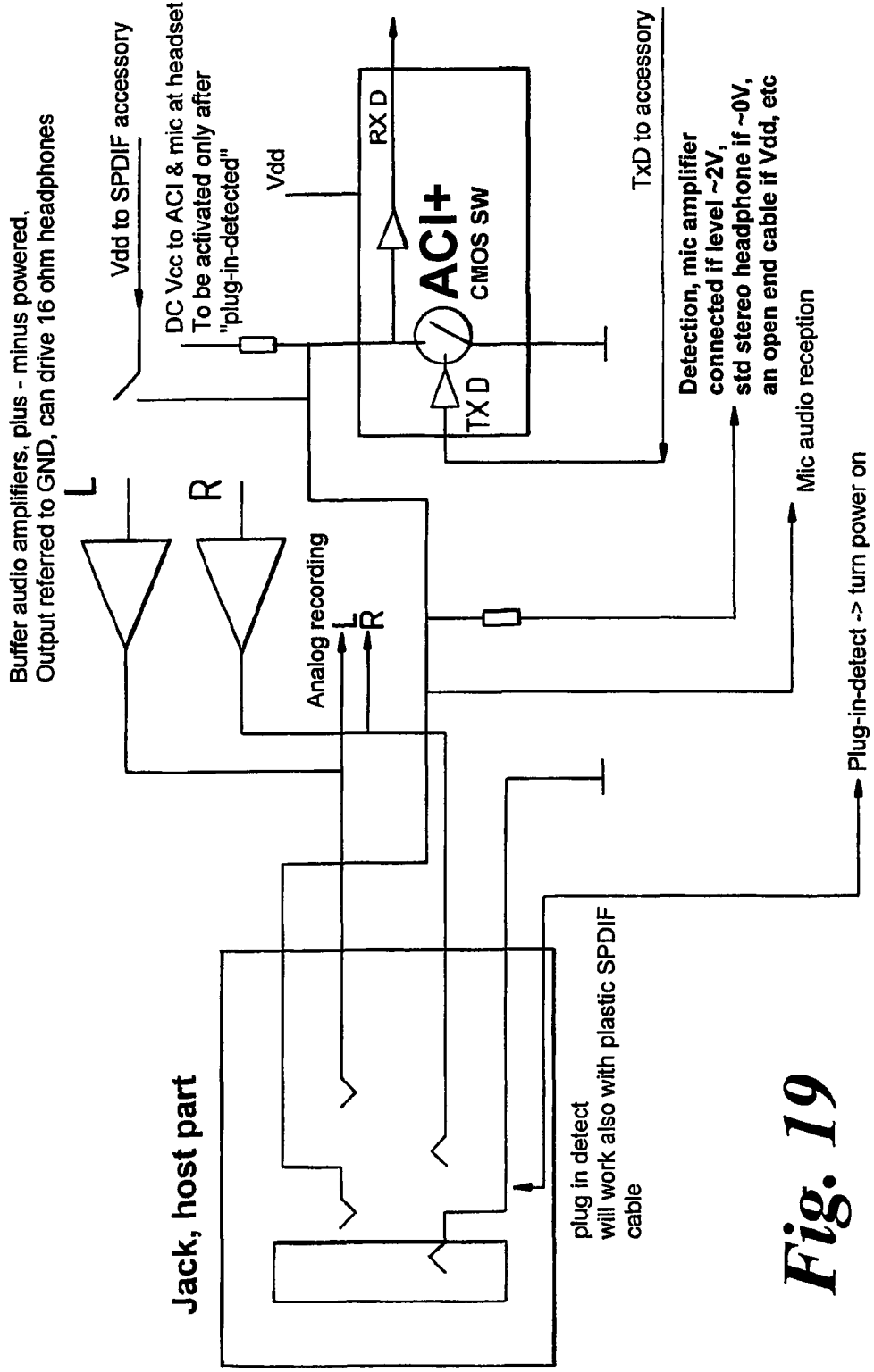
Figure 21:
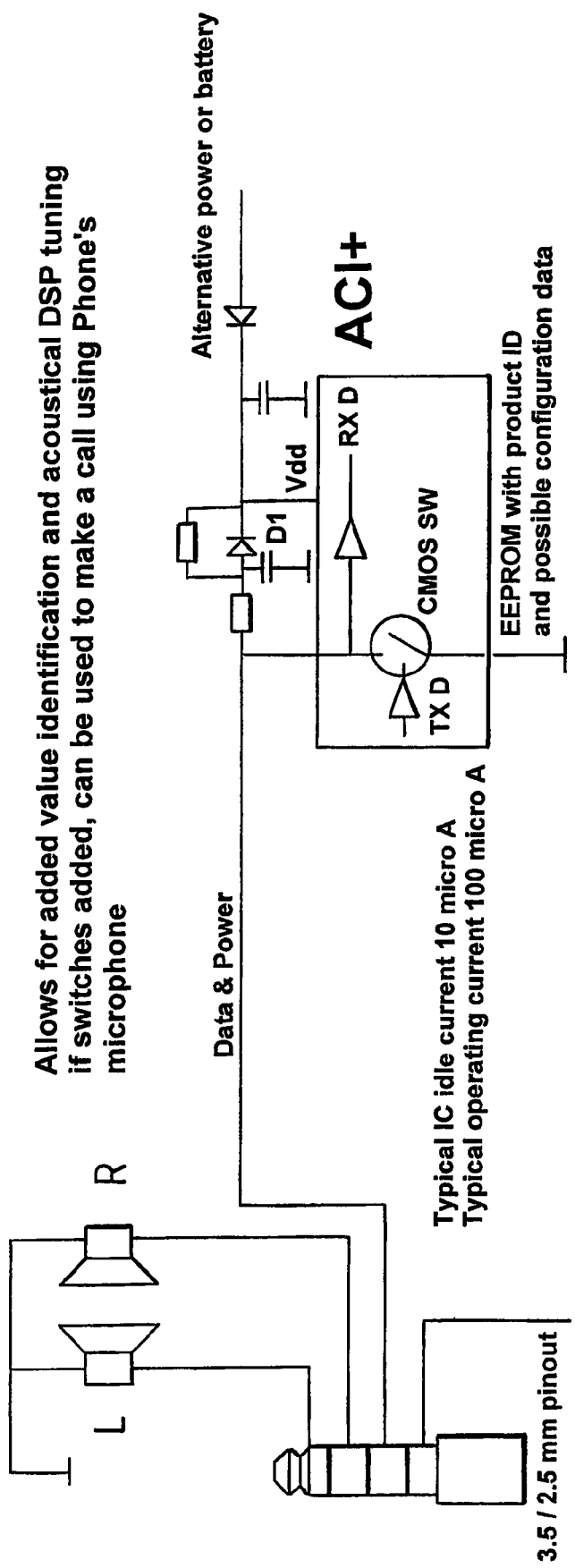
Figure 22:
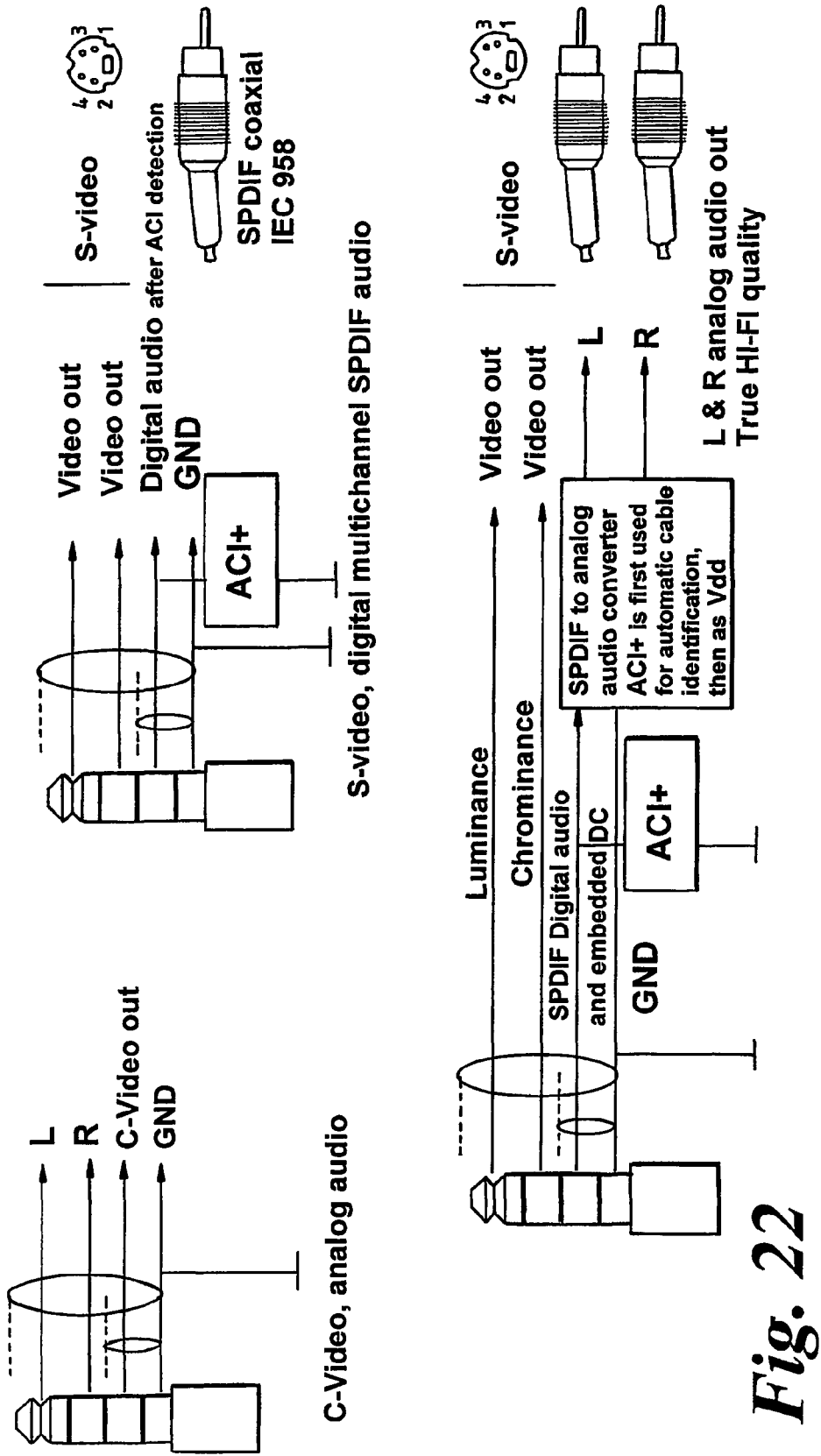
Figure 23:
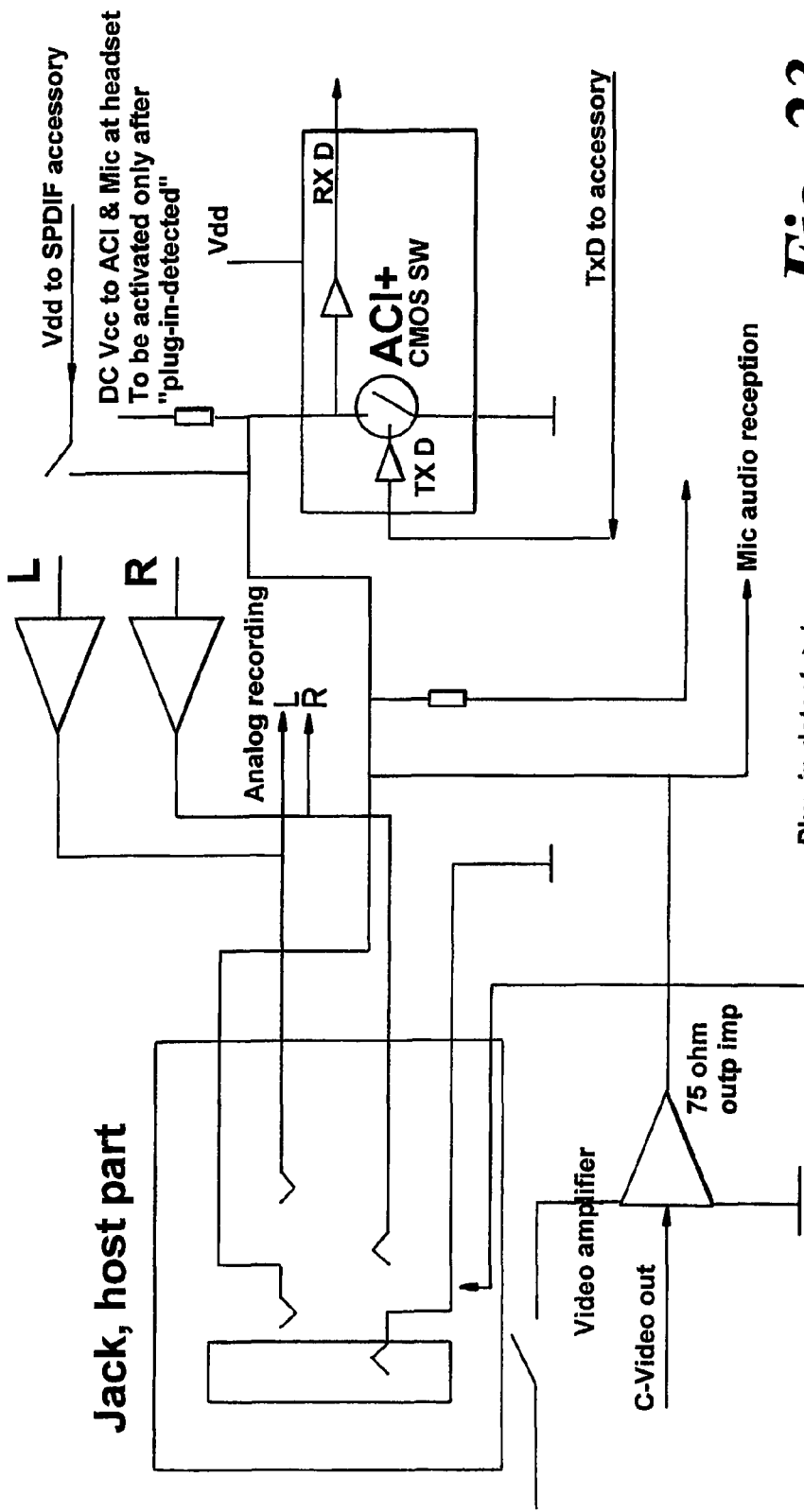
Figure 27:
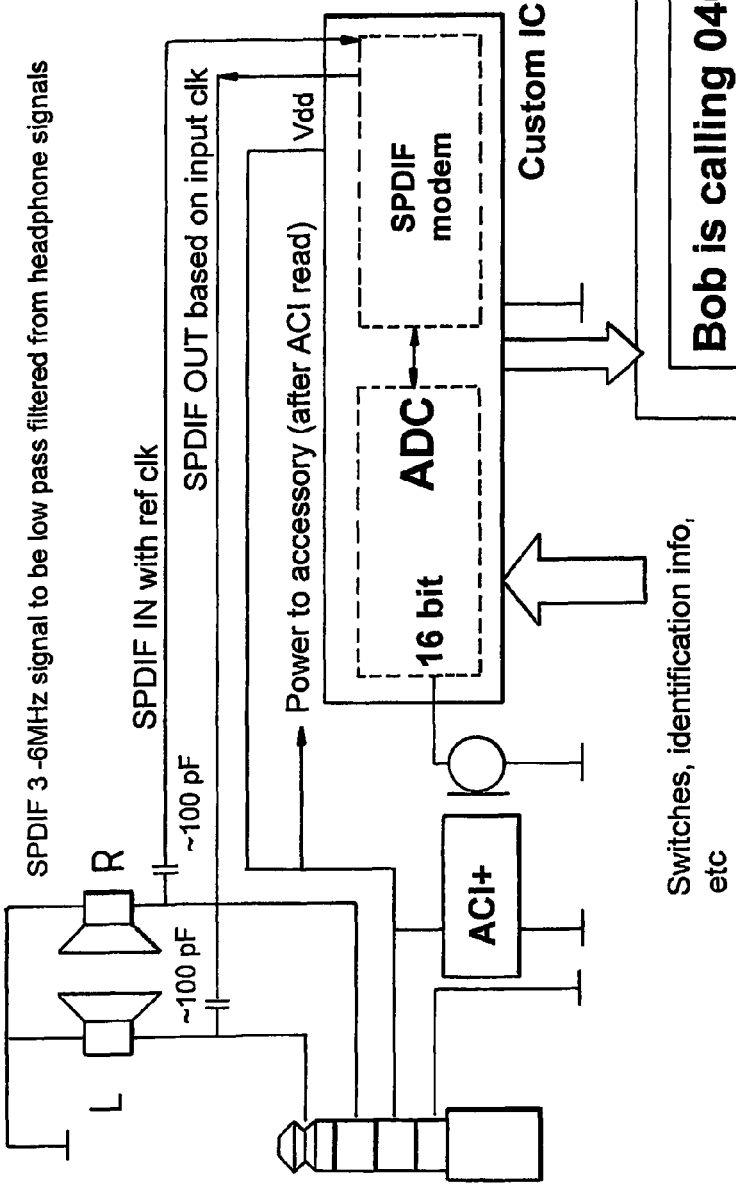
Figure 28:
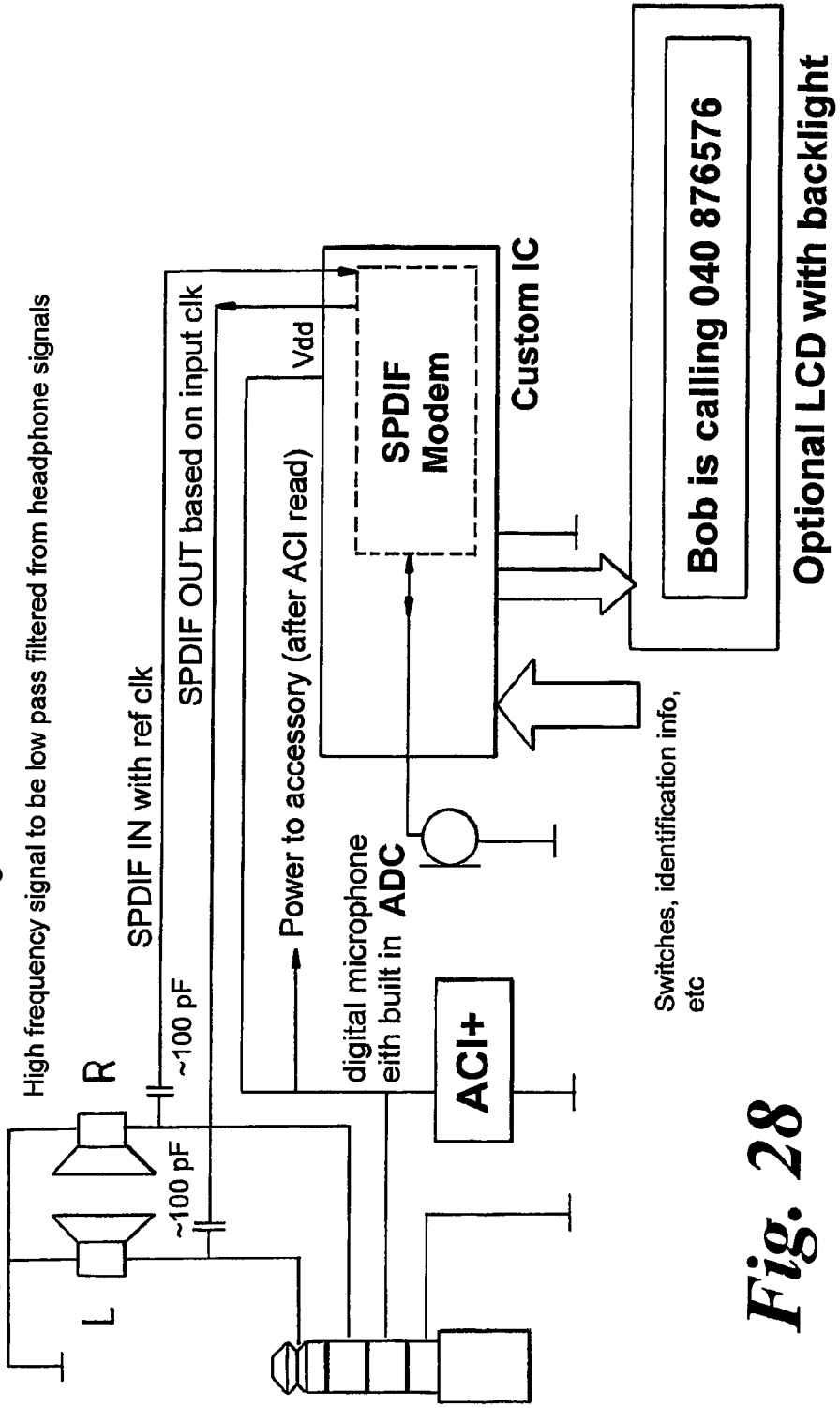
Figure 29:
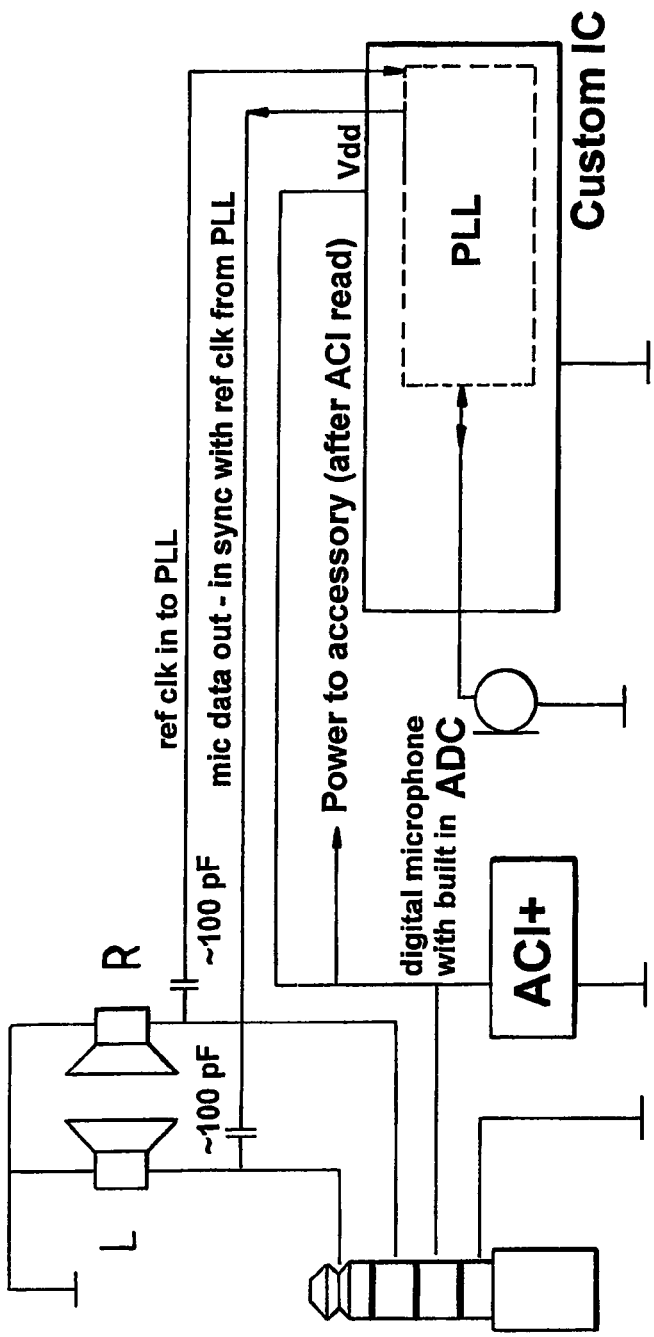
Figure 30A:
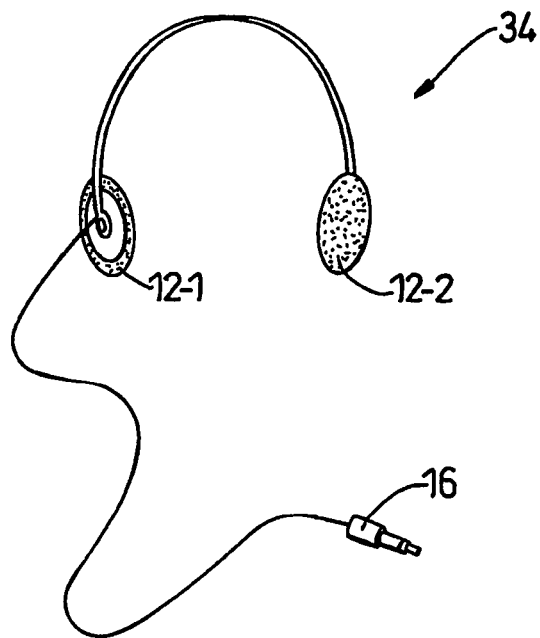
FIGS. 30 and 31 illustrate prior art arrangements of A/V jacks and plugs.
Figure 30B:
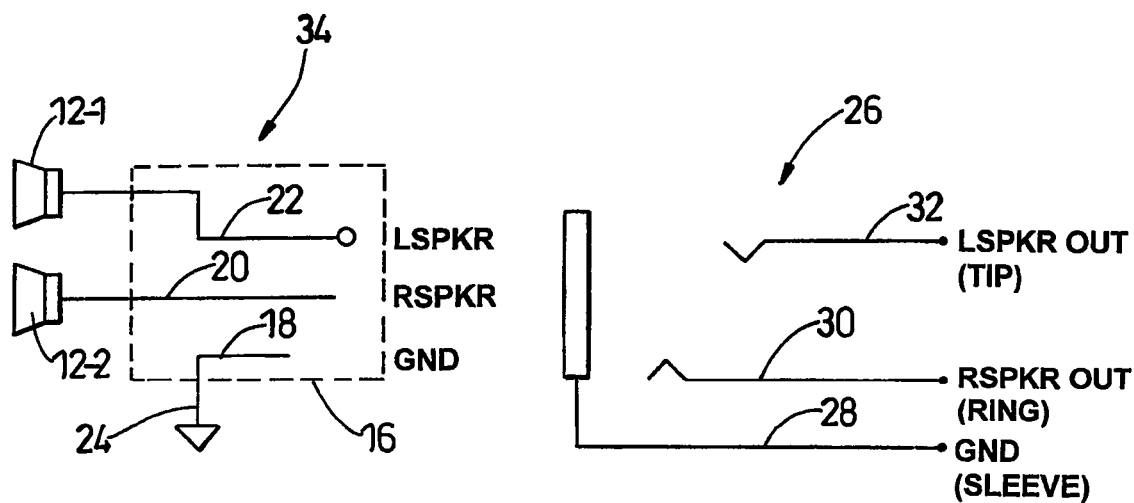
Figure 31A:
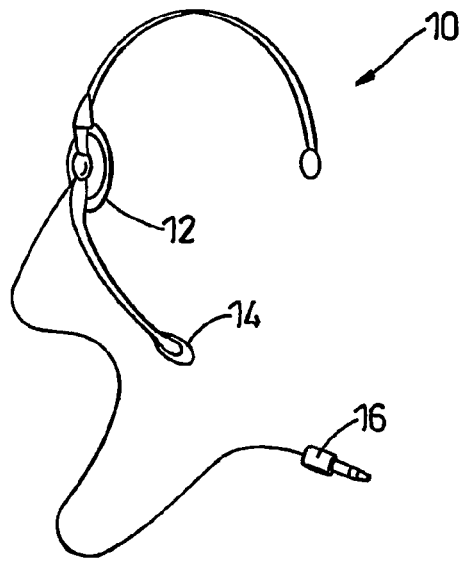
Figure 31B:
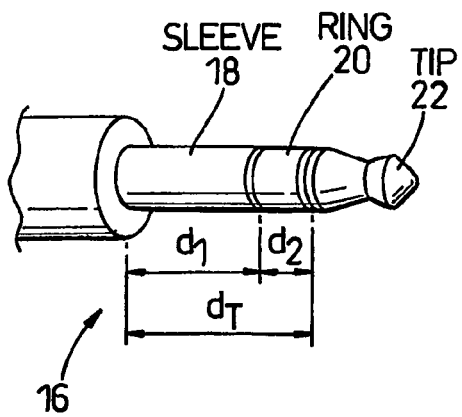
Figure 31C:
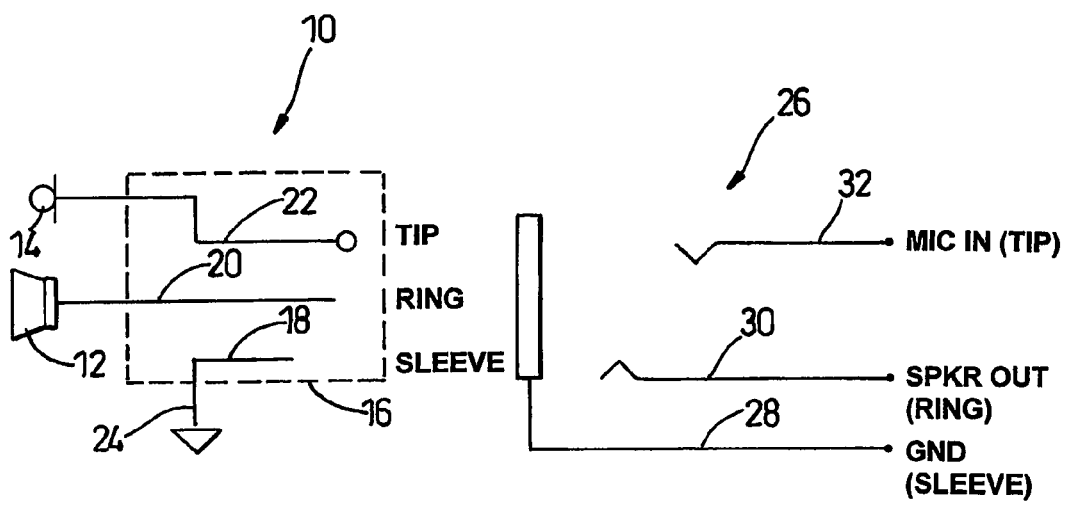

In such cases, the jack is arranged to appropriately route the signalling provided down the signalling connection paths between the electronic device and the A/V plug, according to the function provided by the plug-peripheral device. Thus, in the case that a basic headset with digital identification is plugged in using a 4 pin A/V plug, the jack provides signalling such that the tip of the A/V plug is provided with left speaker signalling, ring/pin 1 is provided with the right speaker signalling, ring/pin 2 is provided with digital identification signalling and the sleeve is the ground (FIG. 17). However, in the case that a stereo headset with a microphone button is plugged in with an A/V plug, ring/pin 2 is provided with microphone signalling (FIG. 18). FIGS. 15 and 19 show configurations which could be used in the electronic device to provide the multiplexed signalling and FIG. 22 shows three different signalling configurations for three different types functionality provided by a 4 pin A/V plug.

In FIG. 15, filtering is not shown in the microphone line, for example, by using one or more capacitors. Such filtering can be employed in the microphone line to the left of the TV/mic mode switch as filtering in the TV line would not be allowed.

It will be appreciated that a particular connection path is used for different types of signalling according to the signalling required down that particular connection path. The signalling required down a particular connection path is determined by the peripheral device which is connected to the electronic device by the A/V plug.

Amplification of signalling may also be used to appropriately adapt the signalling for a particular functionality/configuration of a particular peripheral device.

What is common in FIGS. 15-29 is that the device is able to appropriately route the signalling according to the peripheral device that has been connected to the jack. This may be based on the automatic detection systems described previously or on manual intervention. So, for example, in the case of manual intervention, a user may be able select from a menu of peripheral device types, and once selected the electronic device is arranged to multiplex the signalling according to the peripheral device that has been selected.

Manual intervention can be independent of or be used in combination with automatic detection systems. So, in the case of independent use of manual intervention, there does not need to be any previous automatic detection to, for example, provide a shortlist of peripheral devices which might have been connected or identification of a particular peripheral device which has been connected. A user may just select a particular peripheral device based on his own knowledge (or guesswork). The electronic device may nor even detect that an A/V plug has been inserted.

In the case of manual intervention used in combination with automatic detection systems, the user may be provided with a shortlist of peripheral devices, or a specific identified peripheral device, which has been identified as having been connected.

FIGS. 15-29 also describe alternative configurations of the basic single use system activated in different applications. All the configurations need not be enabled in all embodiments, and other configurations not described may be used in the "single use case", but what is characteristic is the possibility to choose between at least two different AV plug-peripheral device configurations.

The present invention encompasses one or more appropriately adapted combinations of the various aspects and or embodiments mentioned in the specification, whether specifically mentioned in that combination or not, but which are readily combinable. Appropriately adapted computer programs are also within the scope of the present invention.

The invention claimed is:

1. An apparatus comprising:
   at least one processor; and
   at least one memory including computer program code,
   the at least one memory and the computer program code configured to, with the at least one processor, cause the apparatus to perform at least the following:
      detect insertion of a peripheral device A/V plug into a jack of an electronic device, the A/V plug providing an end-terminal for a peripheral device to be connected to the jack;
      determine the configuration details of the peripheral device upon detection of insertion, the configuration details including two or more characteristics of:
         impedance, capacitance, the presence of a short circuit and the presence of an optical signal; and
      discriminate the functionality provided by the peripheral device by using the two or more determined characteristics of the configuration details.

2. The apparatus of claim 1 wherein the memory stores configuration details of a plurality of A/V plug-peripheral device configurations and associated peripheral device functionalities, and wherein the apparatus is configured to use the stored configuration details with the determined configuration details to identify the functionality of the peripheral device connected by the inserted A/V plug.

3. The apparatus of claim 1, wherein the apparatus is operable to select appropriate applications software for the electronic device based on discriminated functionality.

4. The apparatus of claim 1, wherein the apparatus is configured to identify the functionality to discriminate that the electronic device does not support the functionality provided by the peripheral device.

5. The apparatus of claim 1, wherein the apparatus is operable to measure the characteristics at one or more contacts of the A/V plug.

6. The apparatus of claim 5, wherein the jack is configured to make electrical contact with plugs having three contacts: a tip, a ring and a sleeve.

7. The apparatus of claim 5, wherein the jack is configured to make electrical contact with plugs having four contacts: a tip, a first ring, a second ring and a sleeve.

8. The apparatus of claim 5, wherein the apparatus is operable to detect an external voltage applied by a self-powered peripheral device.

9. The apparatus of claim 1, including a photo detector configured to receive the optical signal.

10. The apparatus of claim 1, wherein the apparatus is operable first to determine whether the peripheral device provides digital functionality and then to determine whether the peripheral device provides analogue functionality.

11. The apparatus of claim 1, including a sensor configured to detect insertion of the plug into the jack.

12. The apparatus of claim 1, wherein the apparatus is configured to receive information from the peripheral device identifying the functionality provided by the peripheral device.

13. The apparatus of claim 1, wherein the processor is configured to:
   detect insertion of an A/V plug; and
   test the configuration of the peripheral device to discriminate its functionality upon detection of insertion of the A/V plug.

14. The apparatus of claim 1, wherein the memory comprises configuration details of a plurality of plug-peripheral device configurations and associated peripheral device functionalities, and wherein the processor is configured to:
   detect insertion of an A/V plug; and
   test the configuration of the peripheral device to discriminate the functionality of the peripheral device upon detection of insertion of the A/V plug.

15. The apparatus of claim 1, wherein the apparatus is configured to discriminate a shortlist of two or more possible peripheral devices which may have been connected, and provide the user with the option of selecting one or more of the discriminated peripheral devices from the discriminated shortlist to provide the functionality of the selected peripheral device.

16. The apparatus of claim 1, wherein manual intervention is required to discriminate between two or more peripheral devices which may have been connected.

17. The apparatus of claim 1, wherein the electronic device comprises one or more connection paths to connect to corresponding one or more contacts on the A/V plug, wherein the apparatus is configured to route the signalling down one or more of the connection paths to provide appropriate signalling to one or more of the A/V plug contacts which are appropriate for the signalling required for a peripheral device which has been connected to the jack using the A/V plug.

18. An apparatus according to claim 1, wherein the apparatus is electronic circuitry for an electronic device or is an electronic device.

19. The apparatus of claim 18, wherein the apparatus is electronic circuitry configured to automatically discriminate the functionality provided by the peripheral device.

20. The apparatus of claim 18, wherein the apparatus is electronic circuitry configured to use manual intervention to discriminate the functionality provided by the peripheral device.

21. The apparatus of claim 18, wherein the apparatus is electronic circuitry configured to discriminate the functionality provided by any combination of two, three, four, five, six, seven or more of peripheral devices selected from the following list:
   stereo headset with microphone and button, basic headset with digital identification, basic stereo headphone, basic stereo headphone with digital identification, C-video analog audio, S-video digital multi-channel SPDIF audio, L&R analog audio out True Hi-Fi quality, and digital microphone and data with SPDIF headset/headphone.

22. The apparatus of claim 18, wherein the apparatus is electronic circuitry comprising one or more connection paths configured to be able to connect to corresponding one or more contacts on the A/V plug, and wherein the electronic circuitry is configured to route signalling down one or more of the connection paths to provide appropriate signalling to one or more of the A/V plug contacts according to the configuration/functionality discriminated for the peripheral device, and wherein switches are used to appropriately route the signalling while the AV plug is connected.

23. The apparatus according to claim 22, wherein software is used to appropriately route the signalling while the AV plug is connected.

24. The apparatus of claim 18, wherein the apparatus is electronic circuitry is configured to receive information from the peripheral device to discriminate the functionality provided by the peripheral device, where the peripheral device makes use of enhanced control interface, ECI, or accessory control interface, ACI.

25. A method comprising:
   detecting insertion of an A/V plug into a jack of an electronic device, the A/V plug providing an end terminal for a peripheral device;
   determining configuration details of the peripheral device upon detection of insertion, the configuration details including two or more characteristics of:
      impedance, capacitance, the presence of a short circuit and the presence of an optical signal; and
   discriminating the functionality provided by the peripheral device by using the two or more determined characteristics of the configuration details.

26. An apparatus comprising:
   at least one processor; and
   at least one memory including computer program code,
   the at least one memory and the computer program code configured to, with the at least one processor, cause the apparatus to perform at least the following:
      detect insertion of a peripheral device A/V plug into a jack of an electronic device, the A/V plug providing an end-terminal for a peripheral device to be connected to the jack;
      determine the configuration details of the peripheral device upon detection of insertion, the configuration details including particular values of the voltage per se and the current per se in isolation; and
      discriminate the functionality provided by the peripheral device by using the determined particular values themselves against stored voltage and current values for peripheral devices.

27. A method comprising:
   detecting insertion of an A/V plug into a jack of an electronic device, the A/V plug providing an end terminal for a peripheral device;
   determining configuration details of the peripheral device upon detection of insertion, the configuration details including particular values of the voltage per se and the current per se in isolation; and
   discriminating the functionality provided by the peripheral device by using the determined particular values themselves against stored voltage and current values for peripheral devices.

28. A non-transitory computer readable medium embodied with a computer program comprising computer program code configured to:
   detect insertion of a peripheral device A/V plug into a jack of an electronic device, the A/V plug providing an end-terminal for a peripheral device to be connected to the jack;
   determine the configuration details of the peripheral device upon detection of insertion, the configuration details including two or more characteristics of:
      impedance, capacitance, the presence of a short circuit and the presence of an optical signal; and discriminate the functionality provided by the peripheral device by using the two or more determined characteristics of the configuration details.

29. A non-transitory computer readable medium embodied with a computer program comprising computer program code configured to:
- detect insertion of an A/V plug into a jack of an electronic device, the A/V plug providing an end terminal for a peripheral device;
- determine configuration details of the peripheral device upon detection of insertion, the configuration details including particular values of the voltage per se and the current per se in isolation; and
- discriminate the functionality provided by the peripheral device by using the determined particular values themselves against stored voltage and current values for peripheral devices.

* * * * *